United States Patent
Muhl et al.

(10) Patent No.: US 9,428,349 B2
(45) Date of Patent: Aug. 30, 2016

(54) IMPACTABLE VEHICLE RESTRAINT

(71) Applicant: MULTI-FAB PRODUCTS, LLC, Menomonee Falls, WI (US)

(72) Inventors: Timothy J. Muhl, Slinger, WI (US); Robert J. Hensel, Germantown, WI (US)

(73) Assignee: MULTI-FAB PRODUCTS, LLC, Menomonee Falls, WI (US)

( * ) Notice: Subject to any disclaimer, the term of this patent is extended or adjusted under 35 U.S.C. 154(b) by 269 days.

(21) Appl. No.: 14/150,133

(22) Filed: Jan. 8, 2014

(65) Prior Publication Data
US 2015/0191319 A1 Jul. 9, 2015

(51) Int. Cl.
*B65G 69/00* (2006.01)
*F16H 21/26* (2006.01)

(52) U.S. Cl.
CPC ............. *B65G 69/003* (2013.01); *F16H 21/26* (2013.01)

(58) Field of Classification Search
CPC ... B65G 69/003; B65G 69/006; B65G 69/008; F16H 21/26; F16H 21/22; F16H 21/04; F16H 21/12; F04B 9/02
See application file for complete search history.

(56) References Cited

U.S. PATENT DOCUMENTS

| | | | |
|---|---|---|---|
| 1,404,406 A * | 1/1922 | Prouty | F16H 21/22 74/38 |
| 1,751,474 A * | 3/1930 | Eager | F16H 21/22 74/40 |
| 4,264,259 A | 4/1981 | Hipp | |
| 4,560,315 A | 12/1985 | Hahn | |
| 4,589,813 A * | 5/1986 | Hagen | B65G 69/003 414/396 |
| 4,648,781 A | 3/1987 | Sikora | |
| 4,692,755 A | 9/1987 | Hahn | |
| 4,843,373 A | 6/1989 | Trickle et al. | |
| 5,453,735 A | 9/1995 | Hahn | |
| 5,702,223 A | 12/1997 | Hahn et al. | |
| 5,964,572 A | 10/1999 | Hahn et al. | |
| 6,033,174 A | 3/2000 | Alexander | |
| 6,162,005 A | 12/2000 | Fritz | |
| 6,371,714 B1 | 4/2002 | Sherard et al. | |
| 9,272,854 B2 * | 3/2016 | Lessard | B65G 69/28 |
| 2011/0158778 A1 | 6/2011 | Harrington | |

* cited by examiner

*Primary Examiner* — Glenn Myers
(74) *Attorney, Agent, or Firm* — Ryan Kromholz & Manion, S.C.

(57) ABSTRACT

Systems and methods and methods relating to the control and operation of an impactable vehicle restraint. The impactable vehicle restraint has a vertically movable barrier. The impactable vehicle restraint has a control system having three switch signal inputs that is compatible with two switch input systems. The impactable vehicle restraint has a control system to stop the motion of its drive system for the based on either sensing that the restraining device is at its limits of motion or that the drive system has been activated for a predetermined amount of time, whichever occurs first.

12 Claims, 18 Drawing Sheets

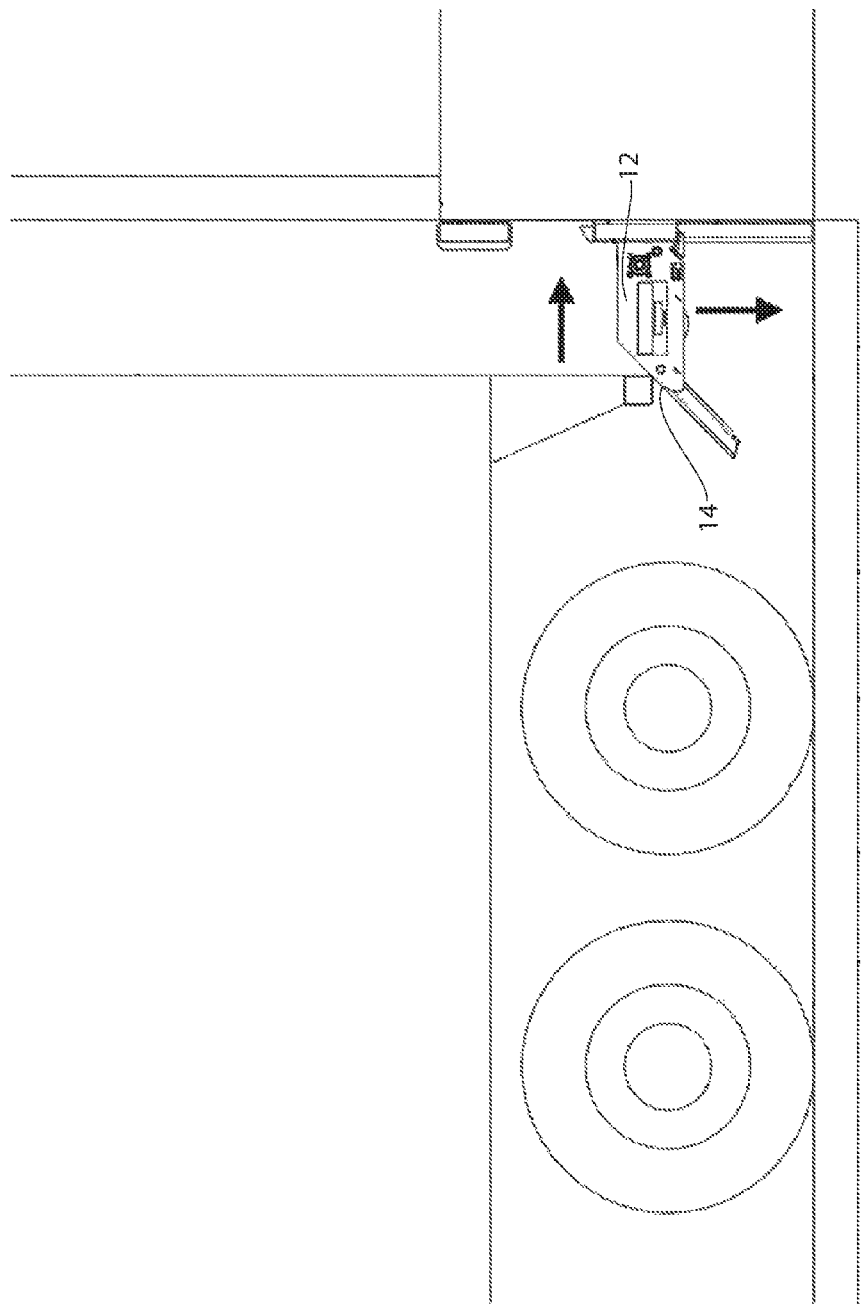

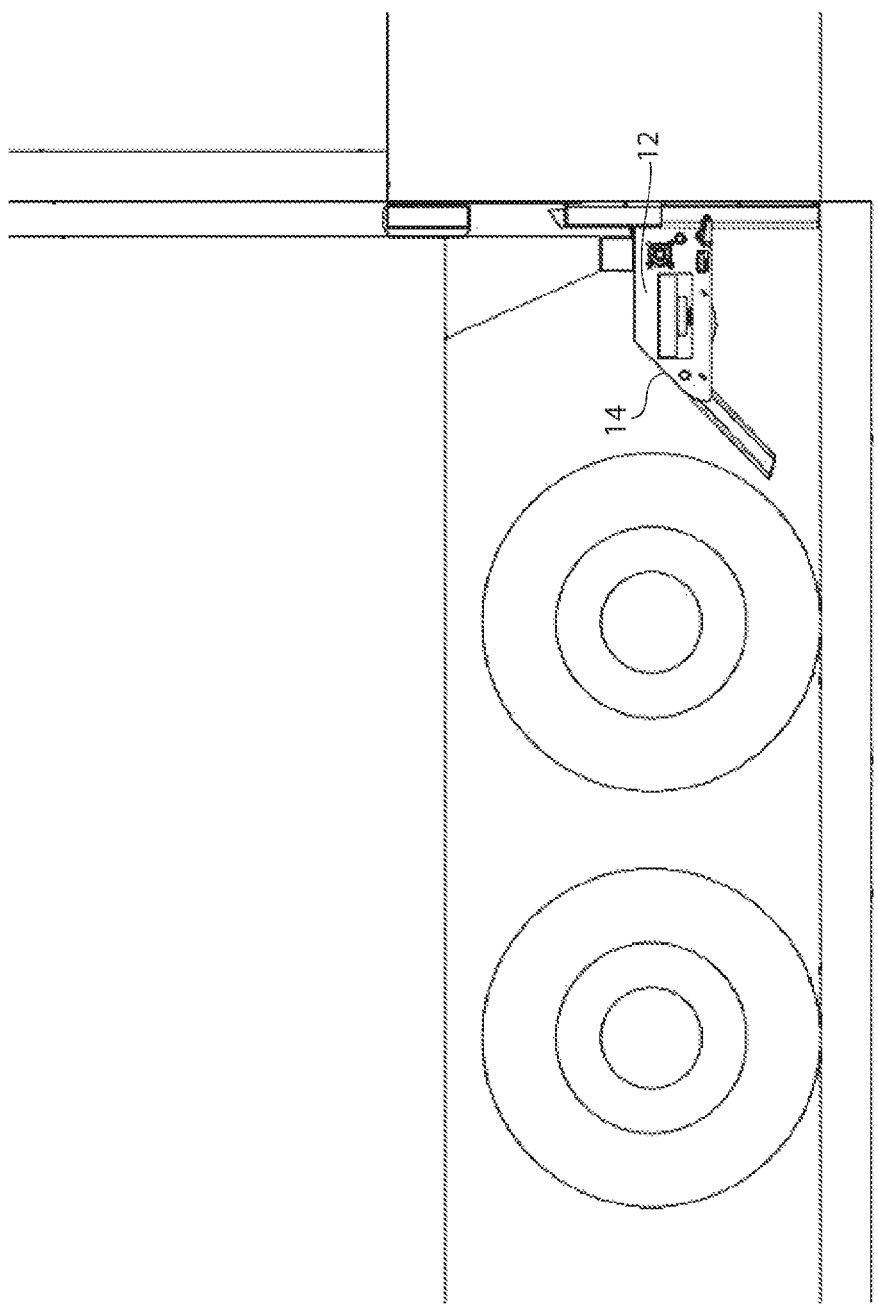

IMPACTABLE VEHICLE RESTRAINT

BACKGROUND OF THE INVENTION

This invention relates to impactable vehicle restraints for use at loading docks. Impactable vehicle restraints are used as a safety precaution at loading docks. Impactable vehicle restraints are used to secure a parked vehicle while the vehicle is being loaded or unloaded. Workers are commonly injured in forklift related accidents, for example, a forklift falling off the edge of a loading dock. Such accidents can occur when a trailer is not properly secured at a loading dock.

Impactable, dock face mounted impactable vehicle restraints that restrain trailers to loading docks for the safe loading and unloading of trailers have been around for over 30 years. In that time, various designs have come about including examples as found in U.S. Pat. No. 4,648,781 by Scott T. Sikora and U.S. Pat. No. 5,964,572 by Norbert Hahn and Brian Bender. These restraints are considered impactable as they are designed to be self-adjusting to the height of the rear impact guard of a trailer, otherwise called the RIG or ICC bar. When the trailer backs into the loading dock and the RIG impacts the restraint, the RIG pushes the restraint down so that it is in the proper location vertically to restrain the trailer.

One feature common to these restraint designs is the use of two switches, referred here as LS1 and LS2, which are used to determine the state of the impactable vehicle restraint. In most rotating hook impactable vehicle restraints there is a cam that operates the two switches based on the hook position, the two switches defining four zones: a hook unlocked zone, a first unsafe zone, a hook locked zone, and a second unsafe zone. LS1 is activated only in the hooked locked zone and LS2 is activated for the three zones after the hook unlocked zone. The control systems of these impactable vehicle restraints can then identify the appropriate zone based on the combined states of LS1 and LS1 and operate red and green outside and inside signal lights and an audible alarm accordingly. A drawback of this system is that from the viewpoint of the controls, both the first and second unsafe zones are the same as they have identical switch state inputs into the control system.

The most common type of impactable vehicle restraint is a rotating hook impactable vehicle restraint, which uses a rotating hook to engage the vehicle trailer. Because of the market success of rotating hook impactable vehicle restraints utilizing the two switches, the control systems that are used with them expect the two switch input as described above to function properly. In designing an impactable, vertical barrier vehicle restraint as described in U.S. Pat. No. 5,964,572 by Norbert Hahn and Brian Bender, they include an ICC sensor that is mechanically linked to the barrier to keep the sensor switches limited to two which provides compatibility with the existing control systems. In this case to keep the backward compatibility with two switch controls came with the added expense of a complex mechanical system.

During a typical process of loading and unloading a trailer, the trailer is jolted up and down due to the weight of the material handling device, typically a fork truck, driving onto and off of the trailer. With the impactable vehicle restraint self-adjusting to the height of the RIG, the restraint is jolted up and down along with the trailer during this process. This up and down motion of the impactable vehicle restraint can cause the restraining barrier to come out of a restraining position and into an unsafe one. To overcome this problem, most impactable vehicle restraint designs that use a gear motor drive system also utilize a clutch or brake in the drivetrain to retain the barrier in position to keep the vehicle restrained to the loading dock. An example of this is shown in U.S. Pat. No. 6,162,005 by Ben Fritz. A disadvantage to these systems is that they can wear out over time or require periodic maintenance to stay in safe working order.

An alternate solution to the problem of the barrier of an impactable vehicle restraint moving to an unsafe condition due to up and down trailer motion is found in U.S. Pat. No. 4,692,755 by Norbert Hahn. This patent describes energizing the motor in predefined increments if the barrier slips out of the hook locked zone to move the barrier back into the zone. The time interval to run the motor as described is 1 second, which is more time than what is needed to move the barrier from a retracted position to an raised position. An unfortunate side effect of this is that the barrier motion is stopped upon contact with either the RIG or mechanical stops in the restraint while the motor is still running. This sudden stop of the barrier combined with the continued powering of the motor results in high stresses in the operating mechanism of the impactable vehicle restraint. Over time this can cause cumulative damage in the operating mechanism components to the point of failure.

SUMMARY OF THE INVENTION

The present invention provides an impactable vehicle restraint having a vertically movable barrier. One aspect of the present invention is to provide an impactable vehicle restraint including a carriage body having at least one vertical member, a rotatable drive shaft disposed at least partially within the carriage body and extending through the vertical member, a barrier disposed at least partially within the carriage, the barrier being linearly movable between a first position and a second position, and a force translator coupled to and between the rotational actuator and the barrier, the force translator causing the barrier to move between the first and second position as a result of the rotatable drive shaft.

An additional aspect of the invention is an impactable vehicle restraint wherein the barrier does not extend beyond the bounds of the carriage body when in the barrier first position.

An additional aspect of the invention is an impactable vehicle restraint where the rotatable drive shaft is coupled to a motor with a rotational output.

An additional aspect of the invention is an impactable vehicle restraint where the force translator further comprises barrier guide means for guiding the linear motion of the barrier.

An additional aspect of the invention is an impactable vehicle restraint where the barrier guide means includes a front guide fixed to the carriage body, the front guide having a first bearing surface, and a rear guide fixed to the carriage body, the rear guide having a second bearing surface.

An additional aspect of the invention is an impactable vehicle restraint where the barrier guide means includes a lower guide fixed to the carriage body, the lower guide having a third bearing surface.

An additional aspect of the invention is an impactable vehicle restraint where the barrier has a front surface and an opposed rear surface, and the movement of the barrier between its first and second positions is guided by the engagement of at least a portion of the first bearing surface with at least a portion of the barrier front surface and at least a portion of the second bearing surface with at least a portion of the barrier rear surface.

An additional aspect of the invention is an impactable vehicle restraint where the force translator further is an over toggle arrangement.

An additional aspect of the invention is an impactable vehicle restraint where the over toggle arrangement includes a drive member having a first end and a second end and a pivot member having a first end and a second end. According to this aspect of the invention, the drive member first end is coupled to the drive shaft, the drive member second end is rotatably coupled to the pivot member first end, and the pivot member second end is rotatably coupled to the barrier.

An additional aspect of the invention is an impactable vehicle restraint where the force translator further comprises a stop linkage coupled to the carrier body, the stop linkage adapted to limit the rotation of the drive member.

An additional aspect of the invention is an impactable vehicle restraint where the over toggle arrangement includes a drive member having a first end and a second end and a lift member having a first end and a second end, the lift member having a race formed at or near the second end thereof. In this arrangement, the drive member first end may be coupled to the drive shaft, the drive member second end may be in sliding engagement with the lift member race, the left member first end may be pivotably coupled to the carriage body, and the lift member second end may be in sliding engagement coupled to the barrier.

An additional aspect of the invention is an impactable vehicle restraint where the force translator includes a first stop linkage coupled to the carrier body and a second stop linkage coupled to the carrier body. The first stop linkage may be adapted to limit the rotation of the drive member in a first direction and the second stop linkage may be adapted to limit rotation of the drive member in a second direction.

An additional aspect of the invention is an impactable vehicle restraint including one or more engaging components coupled to the barrier, where the one or more engaging components may be adapted to slidably engage the second end of the lift member.

An additional aspect of the invention is an impactable vehicle restraint where the force translator further includes a drive member having a first end and a second end and a race formed at or near the drive member second end. The drive member first end may be coupled to the drive shaft and the drive member race may be in sliding engagement with the barrier.

An additional aspect of the invention is an impactable vehicle restraint further including a sliding member coupled to the barrier, where the sliding member may be in sliding engagement with the drive member race.

Another aspect of the invention is to provide an impactable vehicle restraint including a carriage body having at least one vertical member, a portion of the vertical member having a top surface that is generally horizontal, a rotatable drive shaft disposed at least partially within the carriage body and extending through the vertical member, a barrier disposed at least partially within the carriage, the barrier having a front surface, an opposed rear surface, and a top surface, the barrier being linearly movable between a first position and a second position, barrier guide means for guiding the linear motion of the barrier, and a force translator coupled to and between the rotational actuator and the barrier, the force translator causing the barrier to move between the first and second position as a result of the rotatable drive shaft. In this arrangement the force translator includes a drive member having a first end and a second end and the drive member first end may be coupled to the rotatable drive shaft and the drive member second end may be coupled, either directly or indirectly, to the barrier.

An additional aspect of the invention is an impactable vehicle restraint where the plane of the barrier top surface is parallel with or below the plane of the vertical member top surface when the barrier is in its first position, such that the barrier does not extend beyond the bounds of the carriage body when in the barrier first position.

BRIEF DESCRIPTION OF THE DRAWINGS

FIG. 2A is a schematic of a trailer engaging a impactable vehicle restraint attached to a loading dock face, with the trailer making its initial contact with the impactable vehicle restraint.

FIG. 2B is a schematic of a trailer engaging a impactable vehicle restraint attached to a loading dock face, with the impactable vehicle restraint and trailer in their engaged position.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1A:
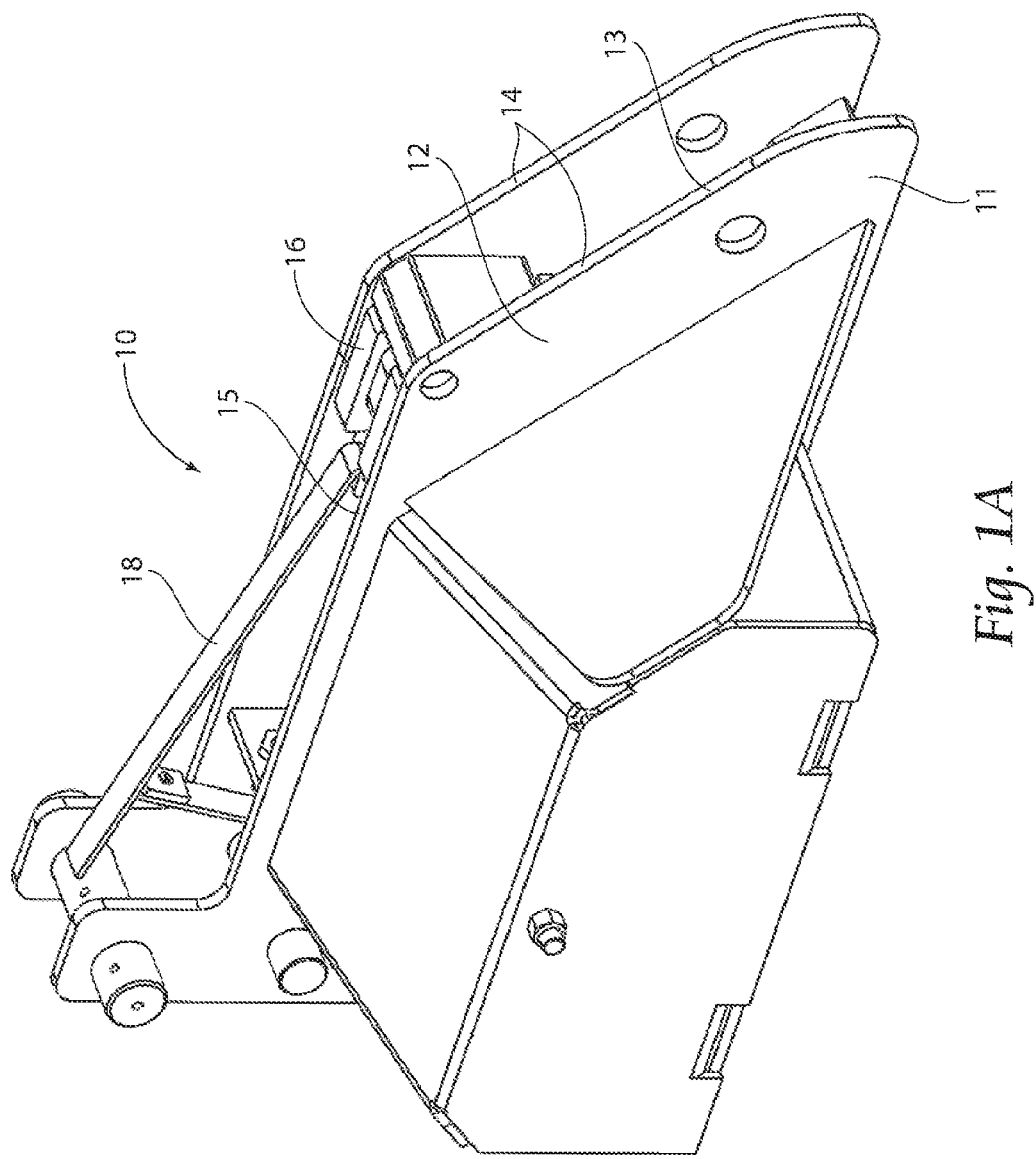
FIG. 1A is a front perspective view of an embodiment of a impactable vehicle restraint according to the present invention with the barrier in the retracted position.
Figure 1B:
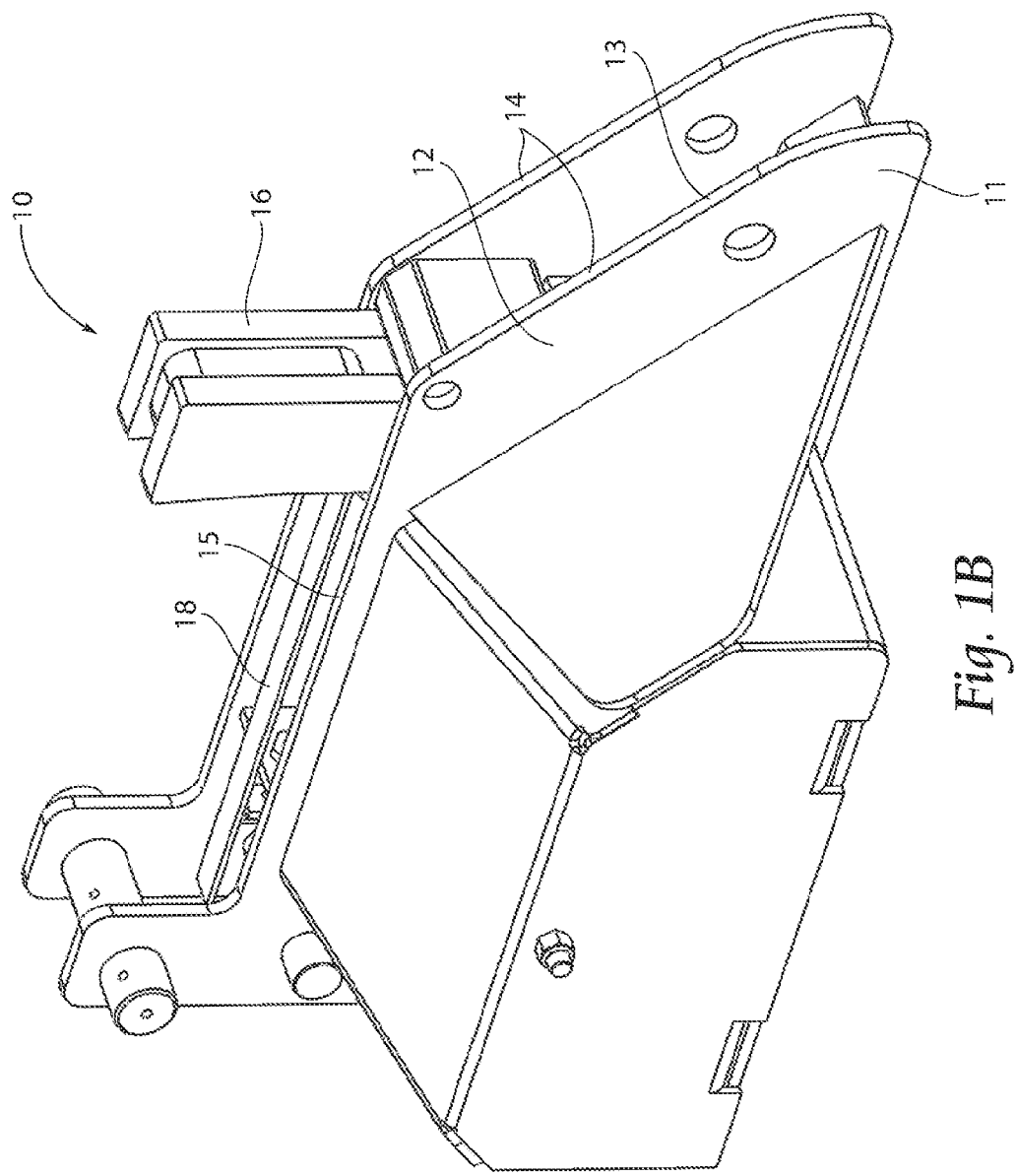
FIG. 1B is a front perspective view of the impactable vehicle restraint of FIG. 1B with the barrier in the raised position.

FIGS. 1A and 1B show an exemplary embodiment of an impactable vehicle restraint 10 having a vertically operable barrier 16 according to the present invention. As shown in FIGS. 1A and 1B, the impactable vehicle restraint preferably includes a carriage body 12 having at least one vertical member 11. The at least one vertical member 11 preferably includes one or more carriage RIG riding surfaces 14. In use, the RIG of a trailer slides along the RIG guide surface(s) 14 on the carriage 12 until the trailer is in place. As shown in FIG. 1A, carriage RIG riding surface 14 preferably includes a sloped portion 13 and a generally horizontal portion 15. As shown in FIGS. 2A and 2B, the impactable vehicle restraint 10 is mounted to the face of a loading dock. Preferably, as is known in the art, the restraint 10 is vertically movable and is biased in a upward position, for example by one or more springs (not shown). As a trailer approaches a loading dock, the RIG engages the carriage 12 and pushes the carriage 12 into position by the backing up of the trailer until the RIG is contacting the carriage RIG riding surfaces 14.

FIG. 1A shows the impactable vehicle restraint 10 in a configuration ready to receive the RIG of a trailer (not shown) with the barrier 16 in a lowered state and the RIG detector 18 in a "RIG not present" state. FIG. 1B, shows the impactable vehicle restraint 10 in its engaged position, the barrier 16 is in a raised state and the RIG detector 18 is in a "RIG detected" state. In the illustrated embodiment of FIGS. 1A and 1B, the RIG detector 18 takes the form of a pivotable bar which is biased in the upward, "RIG not detected" state. In the exemplary embodiment of FIGS. 1A & 1B, the RIG detector 18 is biased by a spring, however it should be understood that the RIG detector may be biased in its upward position using any means known in the art. However, it should be understood that the RIG detector 18 may take any form known in the art.

Figure 3:
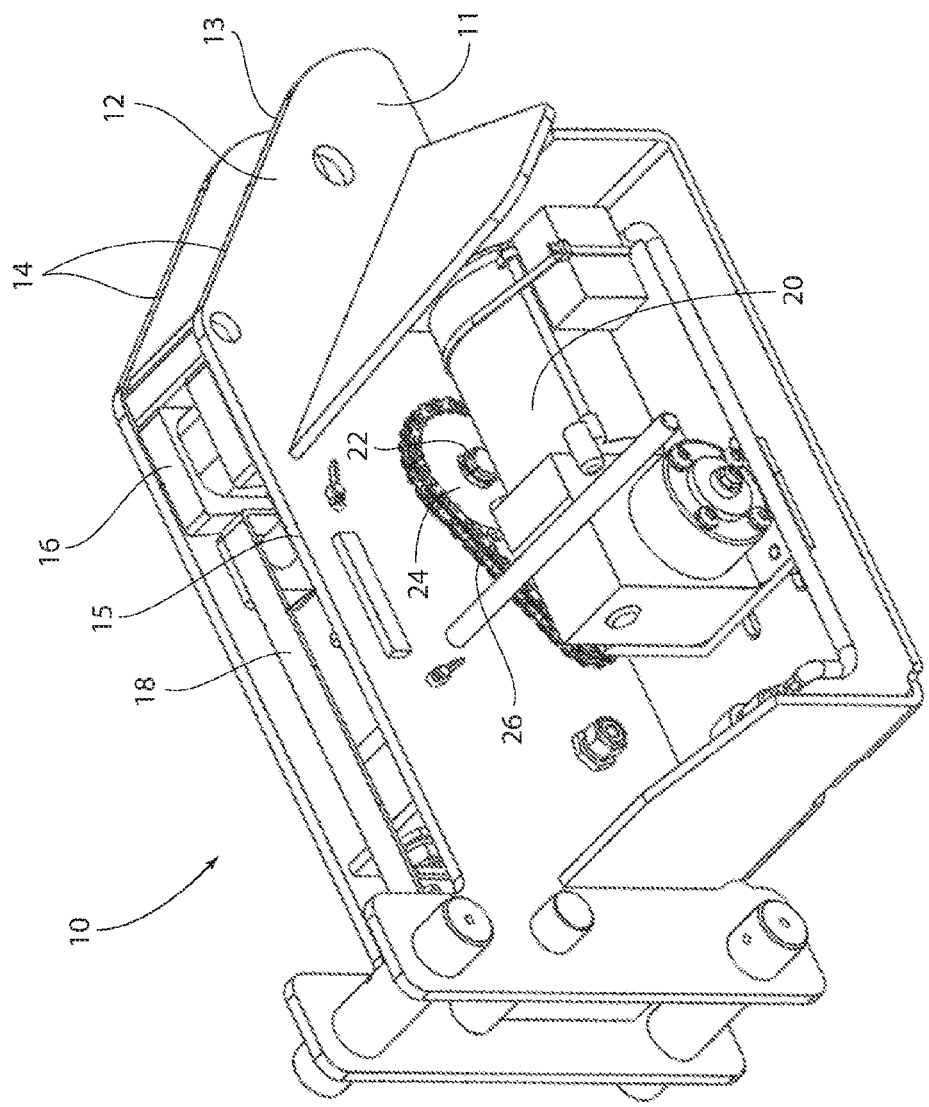
FIG. 3 is a rear perspective view of the impactable vehicle restraint of FIG. 1A with the barrier in the retracted position and the motor cover removed.

Preferably the impactable vehicle restraint includes an actuator and motion translation means to impart motion to the vertically movable barrier 16 and move the vertical barrier 16 between its first retracted and second raised positions. FIG. 3 shows one embodiment of an actuator for imparting motion to the barrier 16. In the illustrated embodiment of FIG. 3, the actuator takes the form of an electric motor 20 coupled to a drive shaft 22. In the illustrated embodiment the electric motor 20 is coupled to a gear case that drives a motor sprocket (not shown). The motor sprocket drives a barrier drive sprocket 24 through a drive chain 26. The barrier drive sprocket 24 is connected to a drive shaft 22. It is contemplated that in some configurations of a impactable vehicle restraint 10, the gear motor can include a brake to prevent the barrier 16 from lowering due to up and down motion of the trailer while loading and unloading. It should be understood that the foregoing illustrated embodiment is provided by way of example, and it should be understood that the barrier 16 may be powered up and down using any means known in the art.

In the illustrated embodiment, the actuator imparts rotational motion. However, it is contemplated that the actuator could be rotational or linear. Further, it is contemplated that the actuator could impart motion to the barrier 16 using any means known in the art. For example, while the illustrated embodiment utilizes motion translation means to impart the motion of the actuator to the barrier 16, it is contemplated that the actuator could work directly on the barrier 16 or through any combination of motion translation members. Likewise, while the illustrated embodiment includes a plurality of components between the actuator and the drive shaft 22, it is contemplated that the actuator can impart motion to the drive shaft 22 either directly or indirectly.

Figure 4:
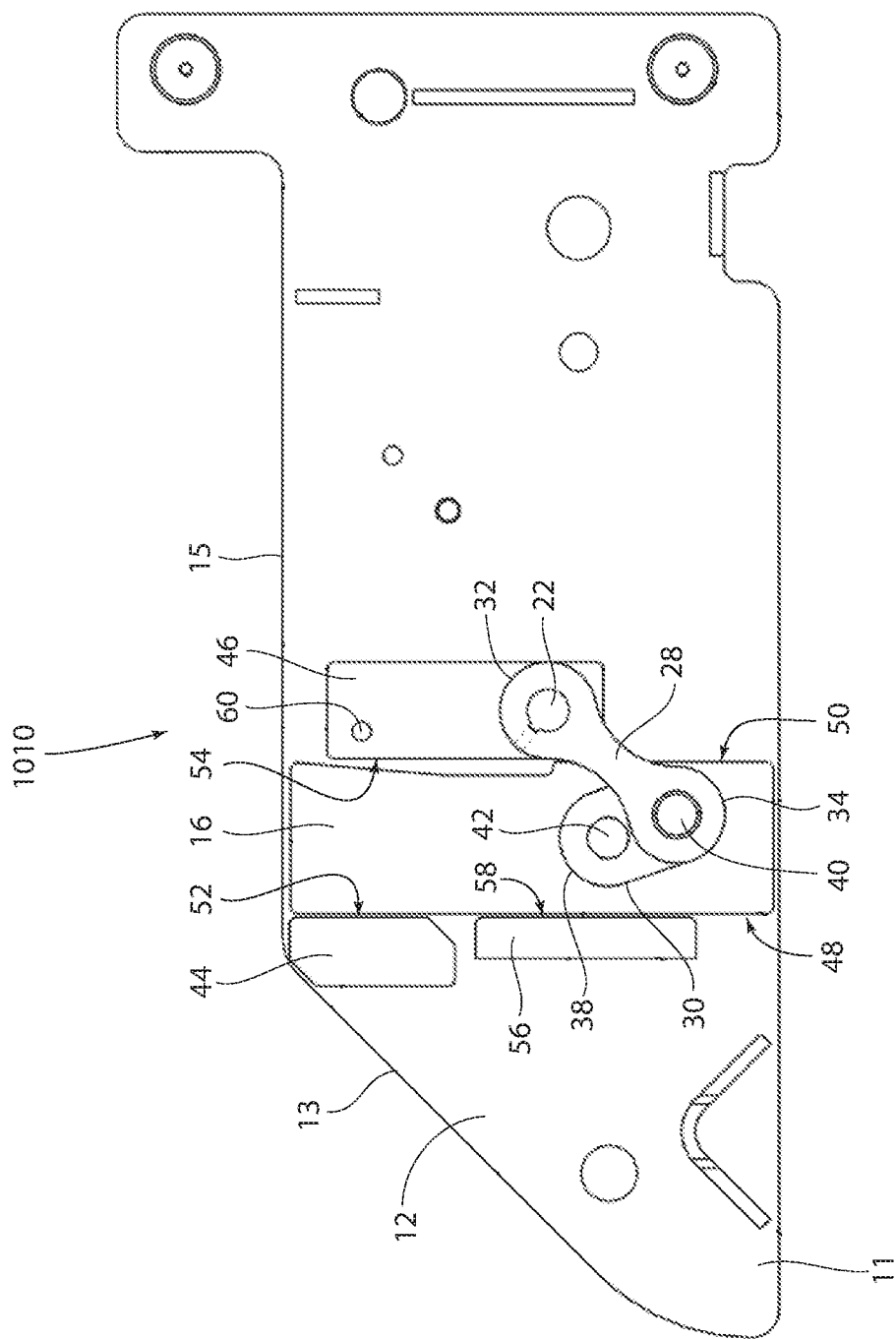
FIG. 4 is a partial right side elevation view of a impactable vehicle restraint with a first embodiment of a motion translation means according to the present invention, with the barrier in the retracted position.
Figure 5:
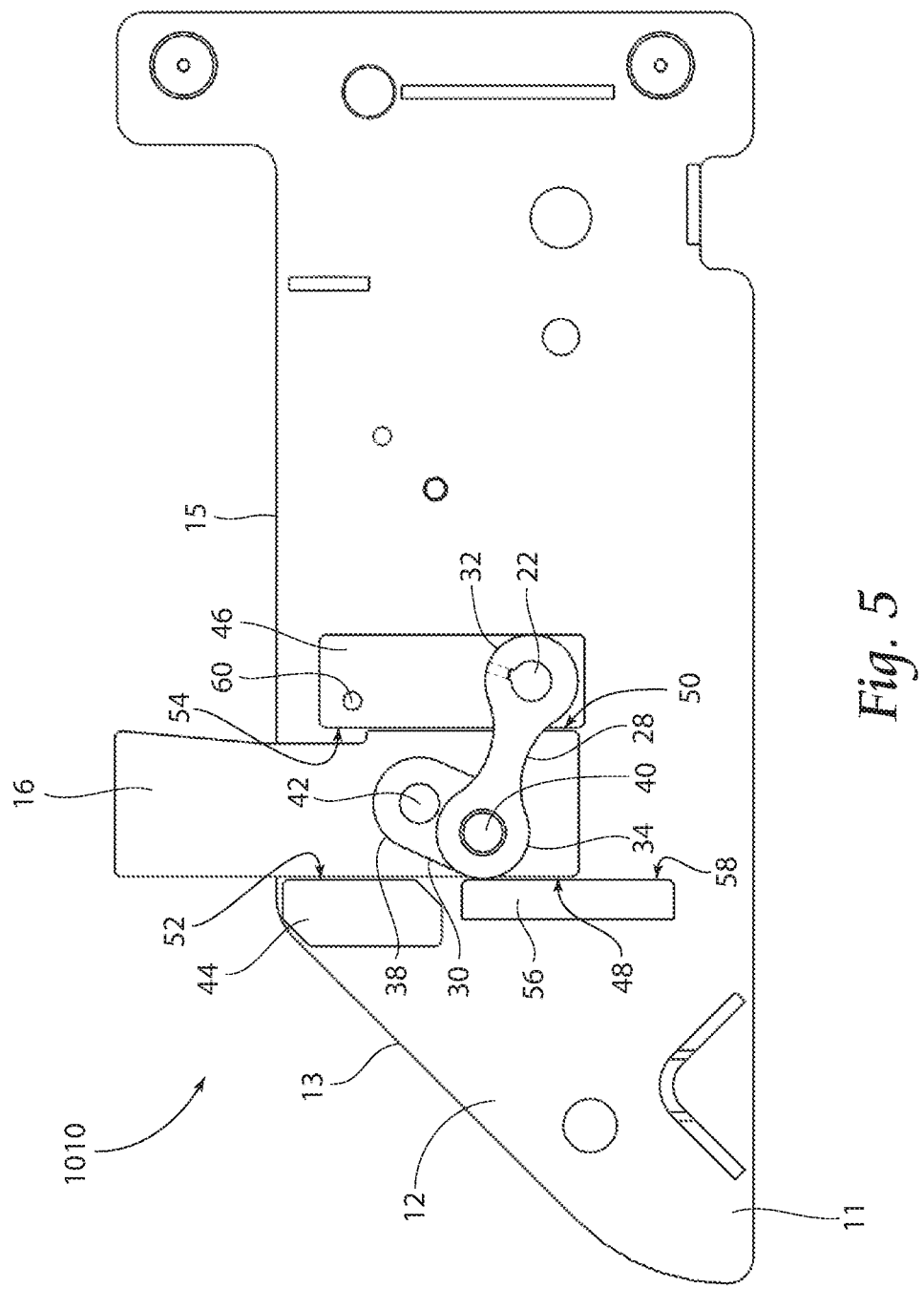
FIG. 5 is a partial right side elevation view of a impactable vehicle restraint with a first embodiment of a motion translation means according to the present invention, with the barrier in the partially raised position.
Figure 6:
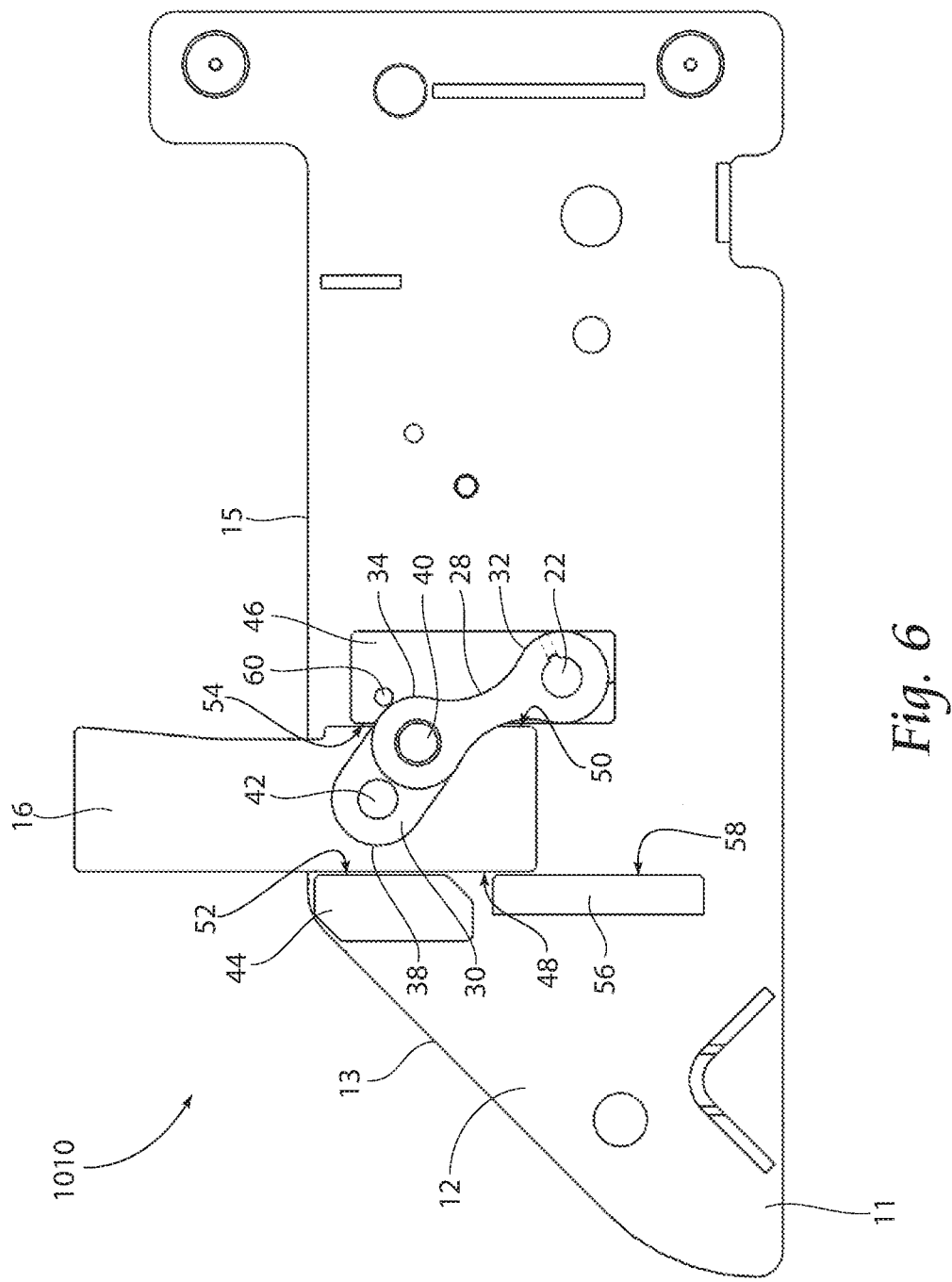
FIG. 6 is a partial right side elevation view of a impactable vehicle restraint with a first embodiment of a motion translation means according to the present invention, with the barrier in the raised position.

It may be desirable to provide the impactable vehicle restraint 1010 with a motion translation means taking the form of an over-toggle linkage arrangement. In this manner, the barrier 16 may be locked in an raised configuration without a break or clutch device in the drivetrain. The over-toggle linkage may take any form known in the art. An exemplary embodiment of one possible over-toggle linkage arrangement is shown in FIGS. 4, 5, and 6. The over-toggle linkage preferably includes a drive link 28 and a pivot link 30. The drive link 28 having a first end 32 and a second end 34. The first end 32 of the drive link 28 is coupled to the drive shaft 22. The second end 34 of the drive link 28 is rotatably coupled to the pivot link 30. The pivot link 30 is adapted to translate the rotation movement of the drive shaft 22 to vertical movement of the barrier 16. Preferably the pivot link 30 has a first end (not shown) and an opposed second end 38 with the first end 36 of the pivot link 30 being coupled to the drive link 28. While FIGS. 4-6 show the second end 34 of the drive link 28 coupled to the pivot link 30 by a drive link pin 40, it should be understood that such coupling may be made using any means known in the art.

The pivot link 30 is rotatably coupled to the barrier 16. Preferably, the second end 38 of the pivot link 30 is coupled to the barrier 16. In the illustrated embodiment the second end 38 of the pivot link 30 is coupled to the battier 16 by a battier link pin 42, however it should be understood that such coupling may be made using any means known in the art.

The over-toggle linkage arrangement preferably also includes guide means for guiding the vertical motion of the barrier 16. In the illustrated embodiment, the guide means includes a front guide 44 and a rear guide 46. The front guide 44 and rear guide 46 are preferably fixedly supported by the carriage body 12 of the impactable vehicle restraint 1010. In the illustrated embodiment, the barrier 16 has a front surface 48 and a rear surface 50. The front guide 44 has at least one bearing surface 52 along which at least a portion of the front surface 48 of the barrier 16 travels. The rear guide 46 has at least one bearing surface 54 along which at least a portion of the rear surface 50 of the barrier 16 travels. In this manner, barrier 16 can only move up and down as it is guided by the front guide 44 and rear guide 46.

The illustrated embodiment further includes a lower guide 56. The lower guide 56 preferably fixedly supported by the carriage body 12 of the impactable vehicle restraint 1010. The lower guide 56 has at least one bearing surface 58 along which at least a portion of the front surface 48 of the barrier 16 travels. In the illustrated embodiment, the lower barrier guide 56 is preferably located substantially beneath the front guide 44.

It is contemplated that lower barrier guide may 56, if desired, be integrally formed or coupled to the front barrier guide 44. Alternatively, the lower barrier guide 56 may be eliminated in embodiments in which the configuration of the front barrier guide 55 provides a suitable guiding surface.

Although the front guide 44, rear guide 46, and lower guide 56 are each shown as having a generally flat bearing surface, it should be understood that these elements may take any form known in the art. For example, and not by way of limitation, one or more of the front guide 44, rear guide 46, and lower guide 56 may take the form of one or more roller bearings.

Preferably, the carriage body 12 is provided with a linkage stop 60. The linkage stop 60 may take any form known in the art, but in the illustrated embodiment takes the form of a member coupled to the rear guide 46. The linkage stop 60 is preferably adapted to engage at least a portion of the drive link 28 to prevent the drive link 28 from further rotation as shown in FIG. 6.

The barrier 16 is movable between a first retracted position (FIG. 4) and a second raised position (FIG. 6). To raise the barrier 16, moving the barrier 16 from its first retracted position to the second raised position, the drive shaft 22 is rotated clockwise which in turn rotates the coupled drive link 28 clockwise about the drive link pin 40. As the drive link 28 rotates clockwise, the pivot link 30 rotates clockwise about the barrier link pin 42 moving the harrier 16 upward. The drive link 28 continues to rotate clockwise until the point of over-toggle when drive link pin 40 rotates past the barrier link pin 42 and the barrier 16 lowers slightly.

At this point as shown in FIG. 6, a surface of the drive link 28 engages the linkage stop 60, which prevents further clockwise rotation of the drive link 28. Any downward force on the barrier 16, including but not limited to gravity, or the up and down motion of a trailer being loaded or unloaded, is transmitted via the barrier link pin 42 to the pivot link 30 to drive the drive link pin 40 to force the drive link 28 clockwise into the linkage stop 60. This over-toggle position of the pivot link 30 and the drive link 28 locks the barrier 16 in the raised position without the need of a brake or clutch in the drive system.

When barrier 16 is to be lowered, the drive shaft 22 is rotated counter clockwise, which in turn rotates drive, link 28 counter clockwise. To release the restraint and lower the barrier 16, the drive link 28 is rotated counterclockwise which slightly raises the barrier 16 while the drive link pin 40 rotates back behind the barrier link pin 42 so that further counterclockwise motion of the drive link 28 lowers the barrier 16 back to the lowered position.

Figure 7:
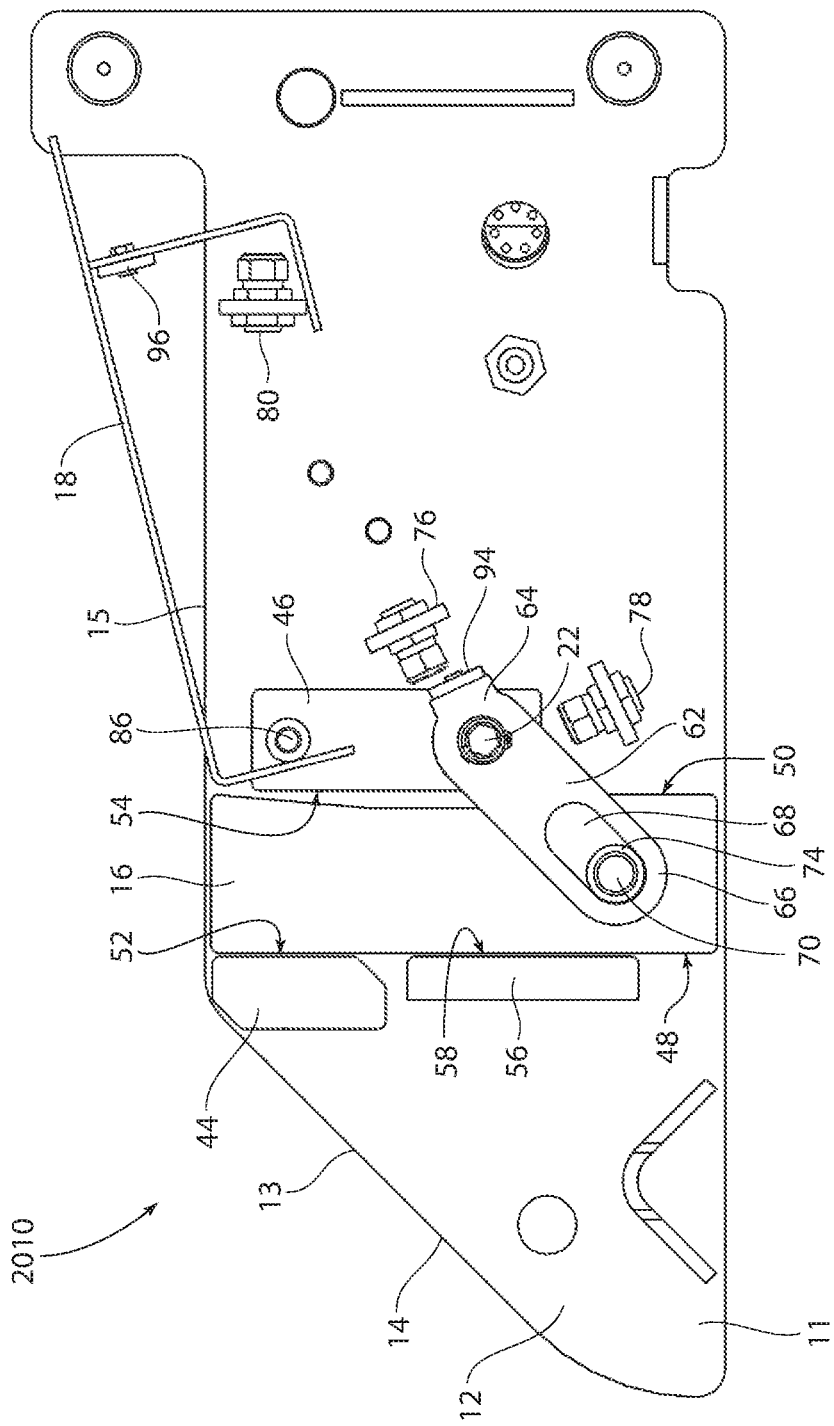
FIG. 7 is a partial right side elevation view of a impactable vehicle restraint with a second embodiment of a motion translation means according to the present invention, with the barrier in the retracted position.
Figure 8:
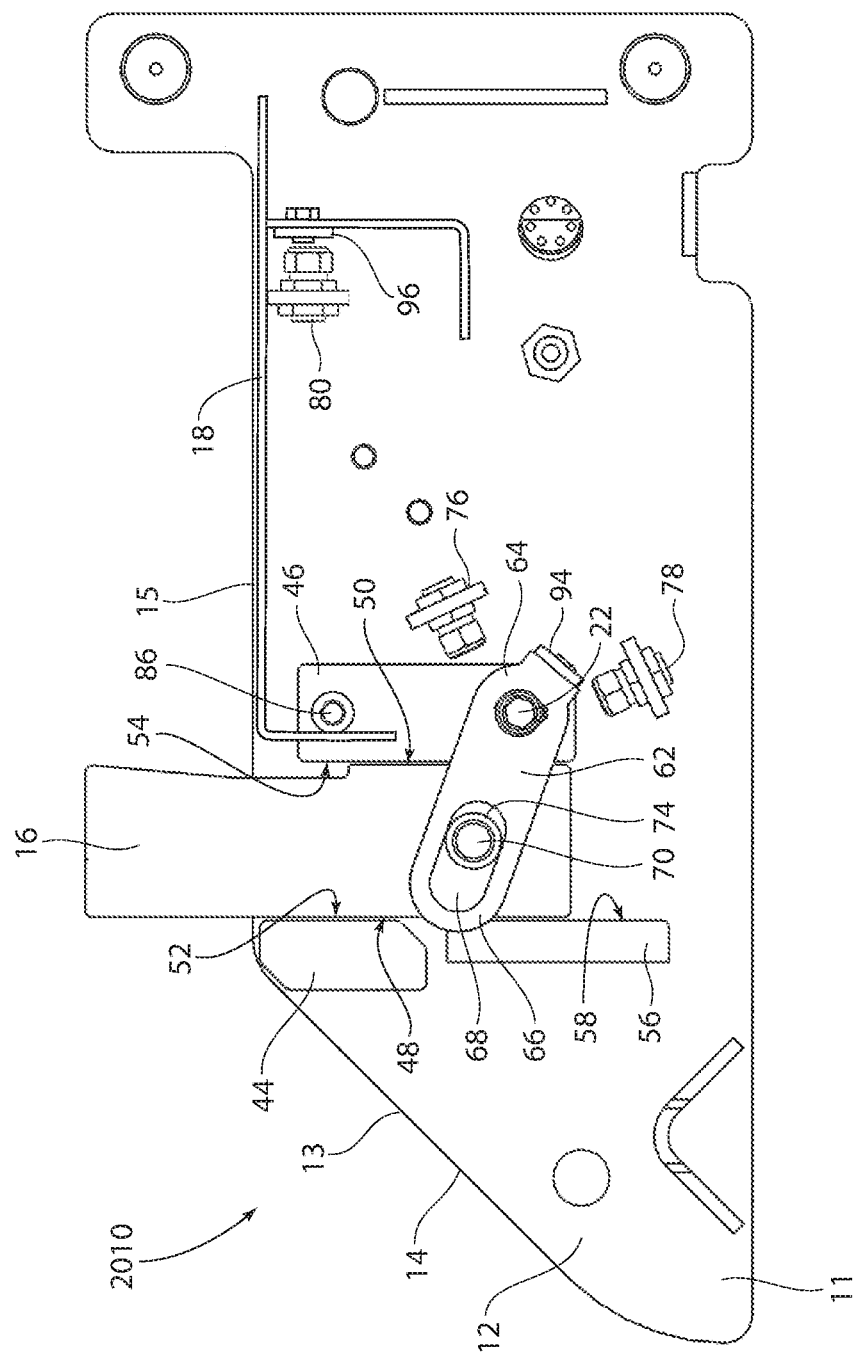
FIG. 8 is a partial right side elevation view of a impactable vehicle restraint with a second embodiment of a motion translation means according to the present invention, with the barrier in the partially raised position.
Figure 9:
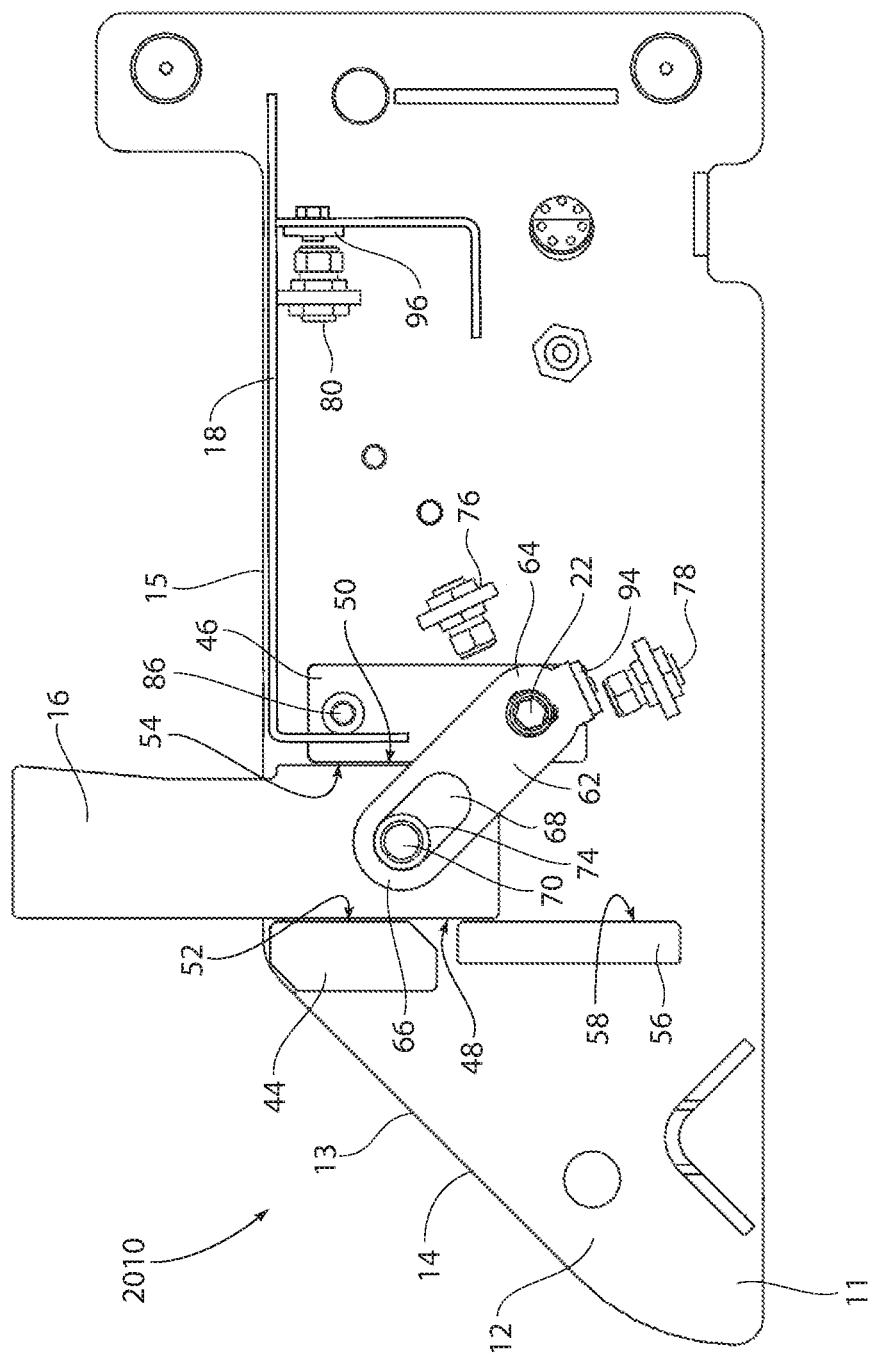
FIG. 9 is a partial right side elevation view of a impactable vehicle restraint with a second embodiment of a motion translation means according to the present invention, with the barrier in the raised position.

An alternative embodiment of an impactable vehicle restraint 2010 includes alternative motion translation means wherein the drive member takes the form of a slider linkage arrangement to raise and lower the barrier 16. The slider linkage may take any form known in the art. An exemplary embodiment of one possible slider linkage arrangement is shown in FIGS. 7, 8, and 9. The slider linkage takes the form of a drive link 62 preferably has a first end 64 and a second end 66. The drive link 62 is coupled at or near its first end 64 to drive shaft 22. In this manner, the drive link 62 is rotated as the drive shaft 22 is rotated. The barrier 16 is slidably engaged with the drive link 62. The drive link 62 preferably includes a race 68 at or near the second end 66 of the drive link 62. The illustrated embodiment, the drive link 62 includes a slot, however, it should be understood that the race 68 may take any form known in the art. The race 68 is adapted to receive at least a portion of a sliding member 70 coupled to the barrier 16. In the illustrated embodiment the sliding member 70 takes the form of a barrier pin coupled to the barrier 16. It should be understood that the slidable coupling between the drive link 62 and the barrier 16 may take any form known in the art. For example, and not by way of limitation, the sliding member may be integrally formed to the barrier 16.

The illustrated embodiment utilizes a roller 74 coupled to the barrier 16 through the barrier pin 72. However, it should be understood that the roller 74 may be coupled to the barrier 16 using any means known in the art. Further, it should be understood that the roller 74 is optional in that its purpose is to reduce friction in the mechanism. Without the roller 74, the barrier pin 72 slides in the slider linkage race 68 and is subject to sliding friction while with roller 74 it is subject to lower rolling friction.

The slider linkage arrangement preferably also includes a front guide 44 and a rear guide 46. The front guide 44 and rear guide 46 are preferably fixedly supported by the carriage body 12 of the impactable vehicle restraint 2010. In the illustrated embodiment, the barrier 16 has a front surface 48 and a rear surface 50. The front guide 44 has at least one bearing surface 52 along which at least a portion of the front surface 48 of the barrier 16 travels. The rear guide 46 has at least one bearing surface 54 along which at least a portion of the rear surface 50 of the barrier 16 travels. In this manner, barrier 16 can only move up and down as it is guided by the front guide 44 and rear guide 46.

The illustrated embodiment further includes a lower guide 56. The lower guide 56 is preferably fixedly supported by the impactable vehicle restraint. The lower guide 56 has at least one bearing surface 58 along which at least a portion of the front surface 48 of the barrier 16 travels. In the illustrated embodiment, the lower barrier guide 56 is preferably located substantially beneath the front guide 44.

It is contemplated that lower barrier guide 56 may, if desired, be integrally formed or coupled to the front barrier guide 44. Alternatively, the lower barrier guide 56 may be eliminated in embodiments in which the configuration of the front carrier guide 44 provides a suitable guiding surface.

To raise the barrier 16, the drive shaft 22 is rotated clockwise which in turn rotates the drive link 62 clockwise. As the drive link 62 rotates clockwise, the front and rear guides 44,46 prevent substantial forward or backward movement by the barrier 16. The change in distance between the barrier link pin and the drive shaft 22 is accommodated by the race in the drive link 62, which in turn allows barrier 16 to raise. When the barrier 16 is to be lowered, the drive shaft 22 is rotated counter clockwise, which in turn rotates the drive, link 62 counter clockwise.

Another embodiment of the present invention provides a control system with means to convert three sensor signals (barrier down, barrier up, and RIG presence) to the equivalent two switch signal from a standard rotating hook vehicle restraint. As shown in the exemplary illustrated embodiment of FIGS. 10 and 11, the impactable vehicle restraint 2010 preferably includes at least three sensors. A first "barrier retracted" sensor 76 is adapted to be engaged when the barrier 16 is in the retracted position. A second "barrier extended" sensor 78 is adapted to be engaged when the barrier 16 is in the extended position. A third "RIG detected" sensor 80 is adapted to be engaged when a RIG is in place on the carrier riding surface 15. The sensors are coupled to an indicator system having at least one light outside the loading dock and at least one light inside the loading dock.

The three sensors are adapted to provide a visual and audible indication of the state of the vehicle through the indication system.

Figure 10:
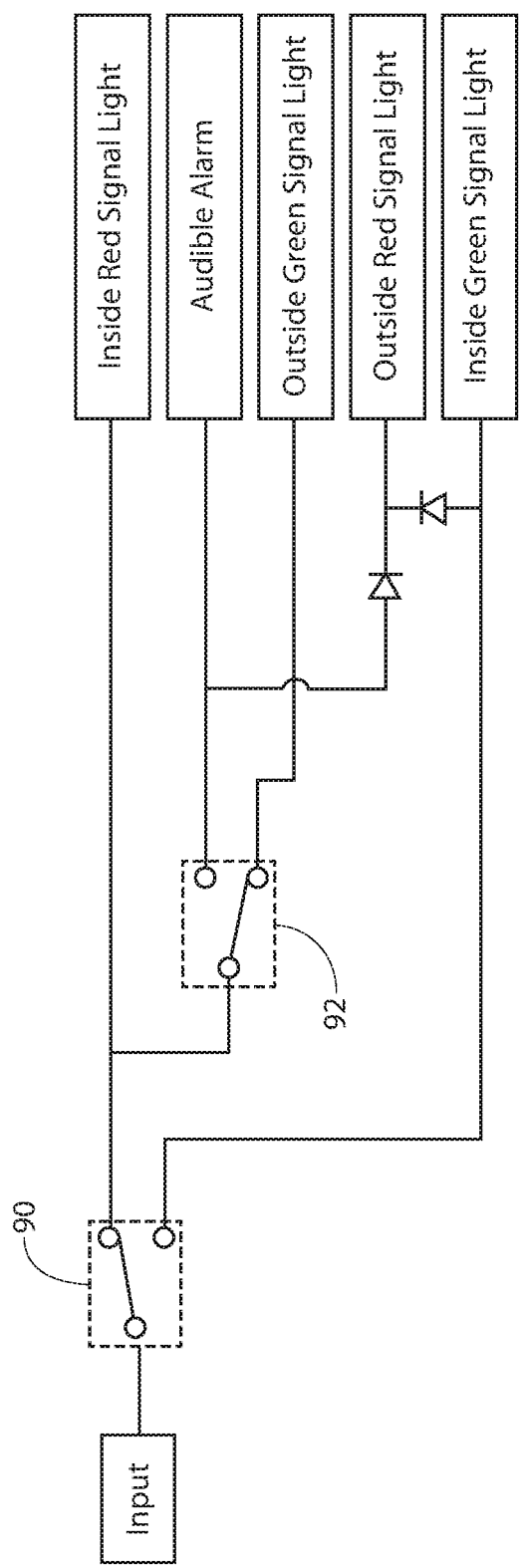
FIG. 10 is an electrical schematic for an embodiment of a two-switch impactable vehicle restraint.

FIG. 10 shows a typical electrical schematic for a standard two switch, rotating hook impactable vehicle restraint. The two switches 90,92 provide outputs to at least one inside signal light and at least one outside signal light as described above. Typically, as shown in FIG. 10, the possible outputs of a standard two switch system are to activate an inside red signal light, activate an audible alarm, active an outside green signal light, activate an outside red signal light and activate an inside green signal light.

Figure 11:
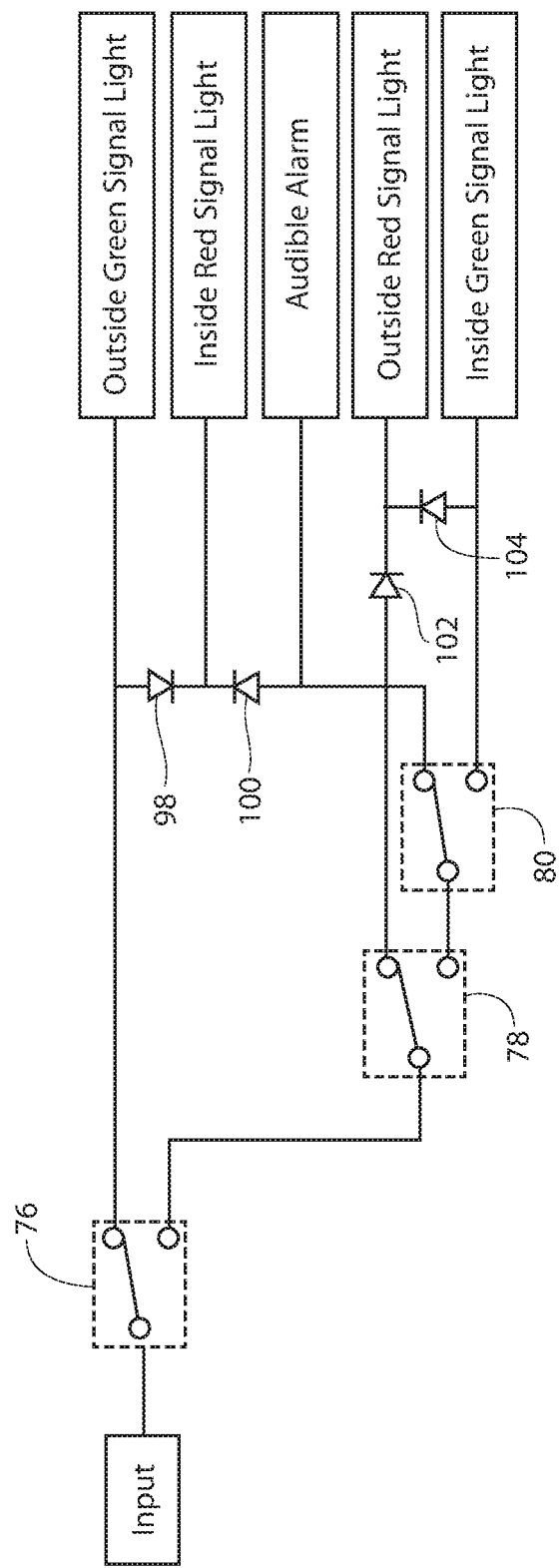
FIG. 11 is an electrical schematic for an embodiment of a three-sensor impactable vehicle restraint.

FIG. 11 is an electrical schematic for an embodiment of a three sensor system according to the present invention, which is a replacement for the two switch system. As described above, the three sensor system preferably includes a barrier retracted sensor 76, a barrier extended sensor 78 and a RIG detected sensor 80. As shown in FIG. 11, the three sensor system may be adapted to provide the same possible outputs as a standard two switch system. In this manner, a carriage including the three sensor arrangement is compatible with existing loading dock equipment. It should be understood that the carriage may be coupled to the loading dock equipment using a wiring harness as is well known in the art.

Preferably, when the barrier 16 is in its retracted position, the barrier retracted sensor 76 is engaged. At this time, the barrier extended sensor 78 is not engaged. If the RIG detected sensor 78 not engaged, the output is that the outside green signal light is engaged and the inside red signal light is engaged. In this manner, the driver knows it is safe to move the trailer into position while a forklift operator knows it is not safe to attempt to enter the trailer.

When the barrier 16 is partway between its retracted and extended position, neither the barrier retracted sensor 76 nor the barrier extended sensor 78 is engaged. If the RIG detected sensor 80 not engaged, an audible alarm is engaged and the outside red signal light is engaged and the inside red signal light is engaged. In this manner, users are alerted that the RIG is not in position, the driver knows it is not safe to move the trailer into or out of position and the forklift operator knows it is not safe to attempt to enter the trailer.

When the barrier 16 is extended, the barrier extended sensor 78 is activated. At this time the barrier retracted sensor 76 is not engaged. If the RIG detected sensor 80 is not engaged, an audible alarm is engaged and the outside red signal light is engaged and the inside red signal light is engaged. In this manner, users are alerted that the RIG is not in position, the driver knows it is not safe to move the trailer into or out of position and the forklift operator knows it is not safe to attempt to enter the trailer.

When the barrier 16 is extended and the RIG detected sensor 80 is activated, the barrier retracted sensor 76 is not activated. In this configuration, the inside green signal light is activated and the outside red signal light is activated. In this manner, the forklift operator knows it is safe to enter or exit the trailer and the driver knows it is not safe to move the trailer. In this manner, using the same inputs and outputs, the illustrated embodiment replaces the standard two switch system with a three sensor system.

An illustrative embodiment of an impactable vehicle restraint utilizing three sensors is shown in FIGS. 7 through 9. As shown in FIG. 9 when the barrier 16 is in the lowered position, the barrier retracted switch 76 is in close proximity and activated by the barrier sensor magnet 94. While the illustrated embodiment shows switches 76,78,80 that are activated by magnetic proximity, it should be understood that any type of alternate switch technology may be utilized in the present invention, including but not limited to physical contact limit switches, inductive and capacitive proximity switches, and optical switches.

As shown in FIG. 8, when the barrier 16 is roughly mid-way between the lower barrier retracted position and the raised barrier raised position. In this configuration, neither the barrier retracted switch 76 nor the barrier extended switch 78 are in close proximity to the barrier sensor magnet 94 and therefore neither switch is active. As shown in FIG. 9 when the barrier 16 is in the fully raised position, the barrier extended switch 78 is in close proximity and activated by the barrier sensor magnet 94. Independent from the barrier 16, the RIG sensor bar 18 pivots about the RIG sensor pivot 86 so that when a RIG is on the carriage RIG riding surfaces 14, the RIG sensor magnet 96 is close proximity to and activates the RIG sensor switch 80. Thus there are three switches; the barrier retracted switch 76, the barrier extended switch 78, and the RIG sensor switch 80, to determine the state of the impactable vehicle restraint.

As outlined, above, the illustrated embodiment uses magnetic switches. FIG. 11 shows an exemplary embodiment of an electrical schematic according to the present invention. As shown in FIG. 7, the barrier retracted switch 76 is engaged, the barrier extended switch 78 is not engaged and the RIG detected switch 80 is not engaged. With the barrier retracted, the barrier retracted switch 76 bypasses the barrier extended switch 78 and the RIG detected switch 80 so that the input is routed to the outside green signal light and via a first diode 98 to the inside red signal light while a second diode 100 prevents the input from further travel.

When the barrier 16 is midway between retracted and extended, the barrier retracted switch 76 has changed state so that the input is routed via the barrier extended switch 78 to the audible alarm, the outside red signal light via a third diode 102, and the inside red signal light via second diode 100 while the first diode 98 and a fourth diode 104 prevent further travel of the input. Once the barrier 16 is extended and the RIG detected switch 80 is not activated, the barrier retracted switch 76 has changed state and the barrier extended switch 78 has changed state. This configuration routs the input via the barrier retracted switch 76 to the RIG detected switch 80 via the barrier extended switch 78 to the audible alarm, the outside red signal light via the third diode 102, and the inside red signal light via the second diode 100 while the first diode 98 and the fourth diode 104 prevent further travel of the input.

When the barrier 16 is extended and the RIG detected switch 80 is activated, the barrier retracted switch 76, the barrier extended switch 78, and the RIG detected switch 80 have all changed state. This configuration routs the input via the barrier retracted switch 76 to the RIG detected switch 80 via the barrier extended switch to the inside green signal light and the outside red signal light via the fourth diode 104 while the third diode 102 prevents further travel of the input.

Impactable vehicle barrier devices typically include an actuator adapted to move the restraining device between the unrestrained configuration and restrained configuration, and vice-versa. As described above, in the illustrated embodiment the drive system takes the form of a motor 20 coupled to a drive shaft 22. However, it should be understood that the drive system can take any form known in the art. Typically, the actuator or drive motor 20 is engaged for a predetermined amount of time whether of not the barrier 16 is still moving. In some cases, this will cause the motor 20 to continue to run even though the barrier 16 is in position and is no longer moving. The sudden stop of the barrier 16, along with the continued powering of the motor 20 can cause high stresses in the operating mechanism of the impactable vehicle restraint 10. This can, over time, cause damage to the operating mechanism, which can result in failure. It is contemplated that it may be desirable for the impactable vehicle barrier device 10 to include a control system adapted to stop the motion of the drive system for the restraining device 10 based on sensing that the restraining device is at its limits of motion or a pre-determined amount of time has transpired since the drive system has been activated, whichever event happens first.

Figure 12:
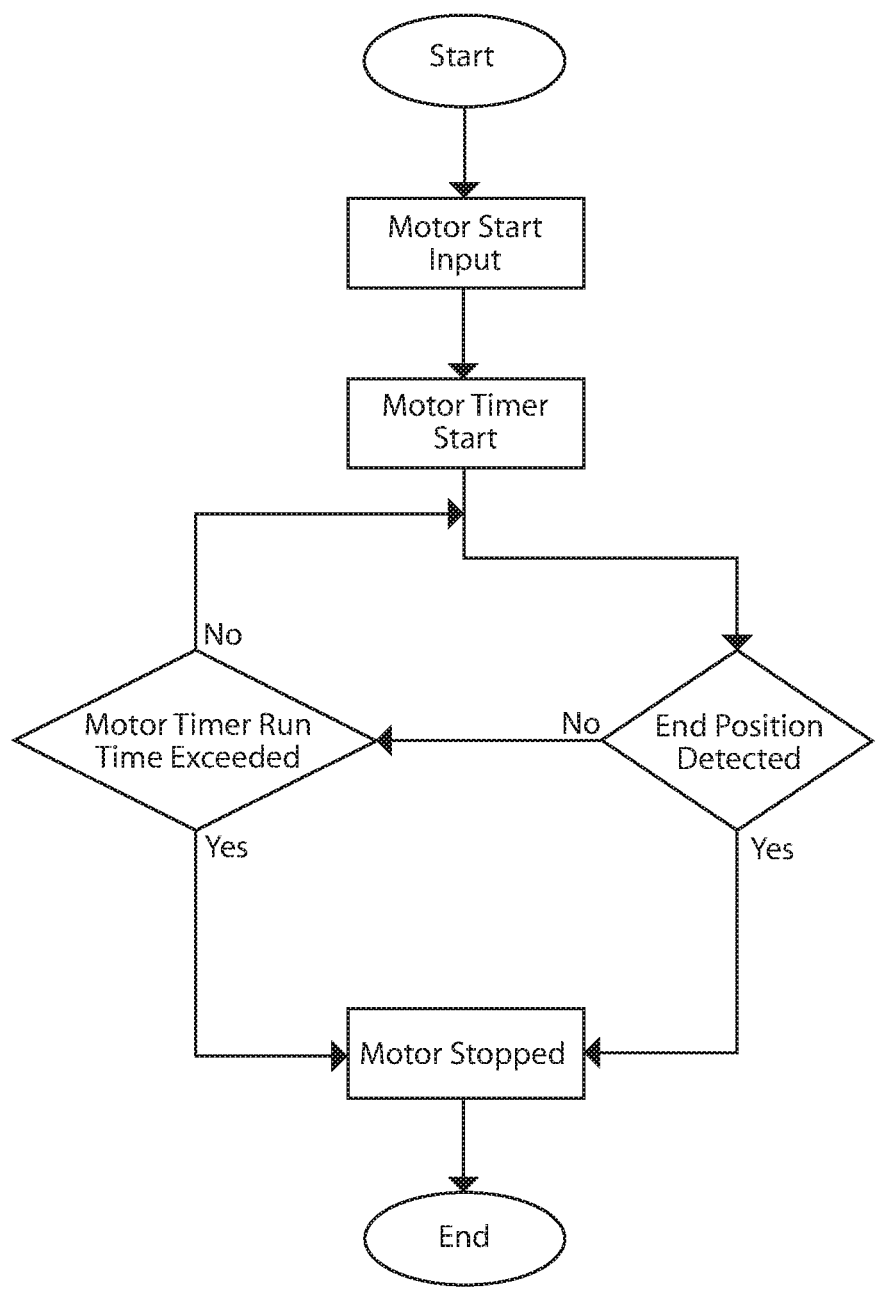
FIG. 12 is a flow chart for an embodiment of a control system for energizing a motor for a impactable vehicle restraint.

A flow chart of an embodiment of control system is shown in FIG. 12. An input to start the drive system is received which starts the drive motor and starts a motor timer. After a predetermined period of time the control system checks whether or not the end position has been detected. In the illustrated embodiment, this can be determined by the state of either the barrier retracted switch 76 or barrier extended switch 78. If either the barrier retracted 76 or barrier extended switch 78 is engaged, the end position is detected. If the end position is detected the motor is stopped. If the end position is not detected, the motor run timer is checked. If the predetermined run time has been exceeded, the motor is stopped. If the predetermined run time has not been exceeded, the logic loops back to checking if the end position is detected. This then allows the drive system of the impactable vehicle restraint 10 to engage or store the barrier 16 based on the travel of the barrier 16 or the time it takes for the barrier 16 to travel, whichever comes first. Typically the predetermined run time of the motor timer for an impactable vehicle restraint is 1.5 seconds, however, the timer could it could be of any duration that reliably allows full travel of the barrier. It should be appreciated that although the control system described above is described in connection with a vertical barrier restraint according to the present invention, the control system may be used in connection with any electronically controlled impactable restraint known in the art.

Figure 13:
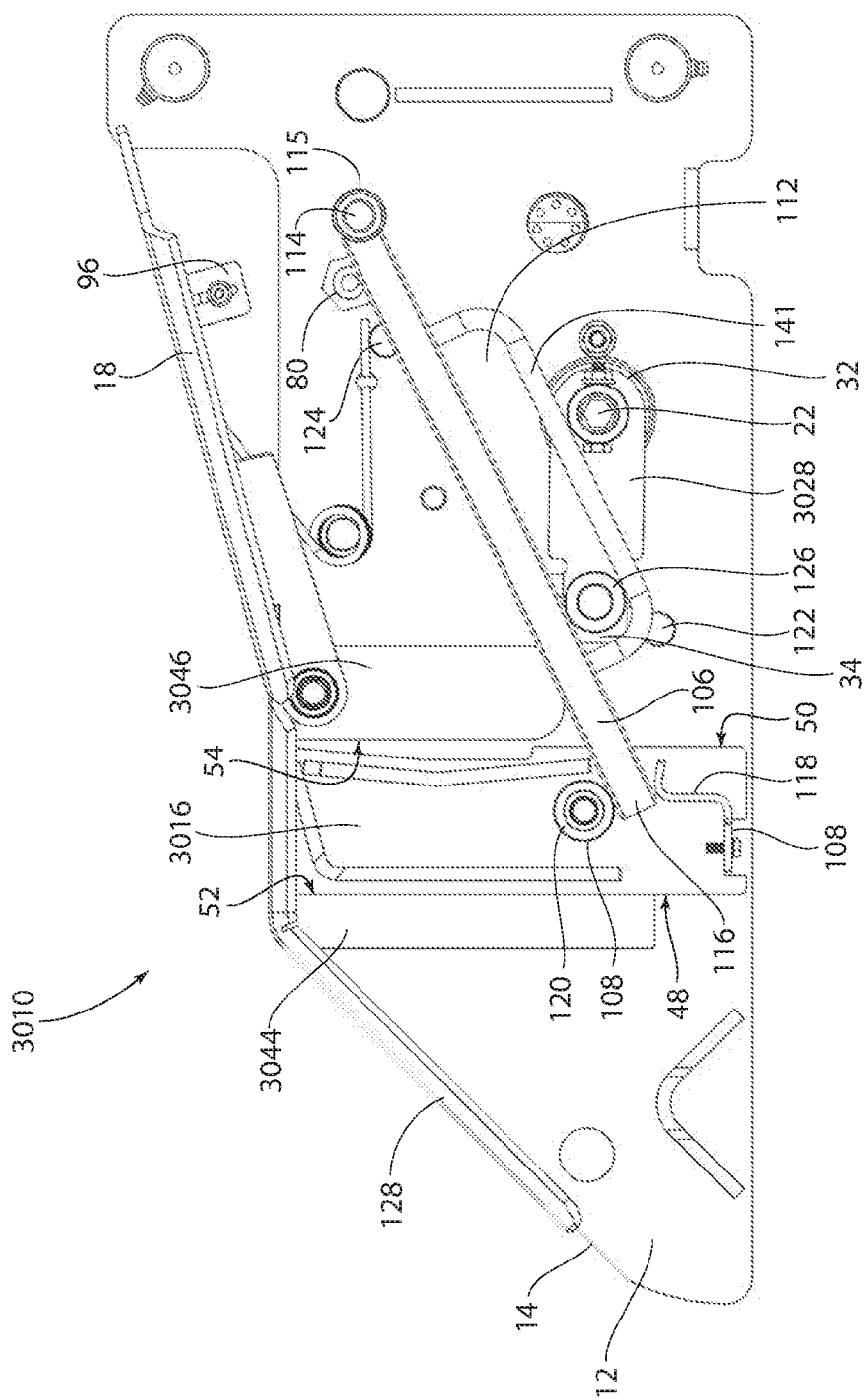
FIG. 13 is a partial right side elevation view of a impactable vehicle restraint with a third embodiment of a motion translation means according to the present invention, with the barrier in the retracted position.
Figure 14:
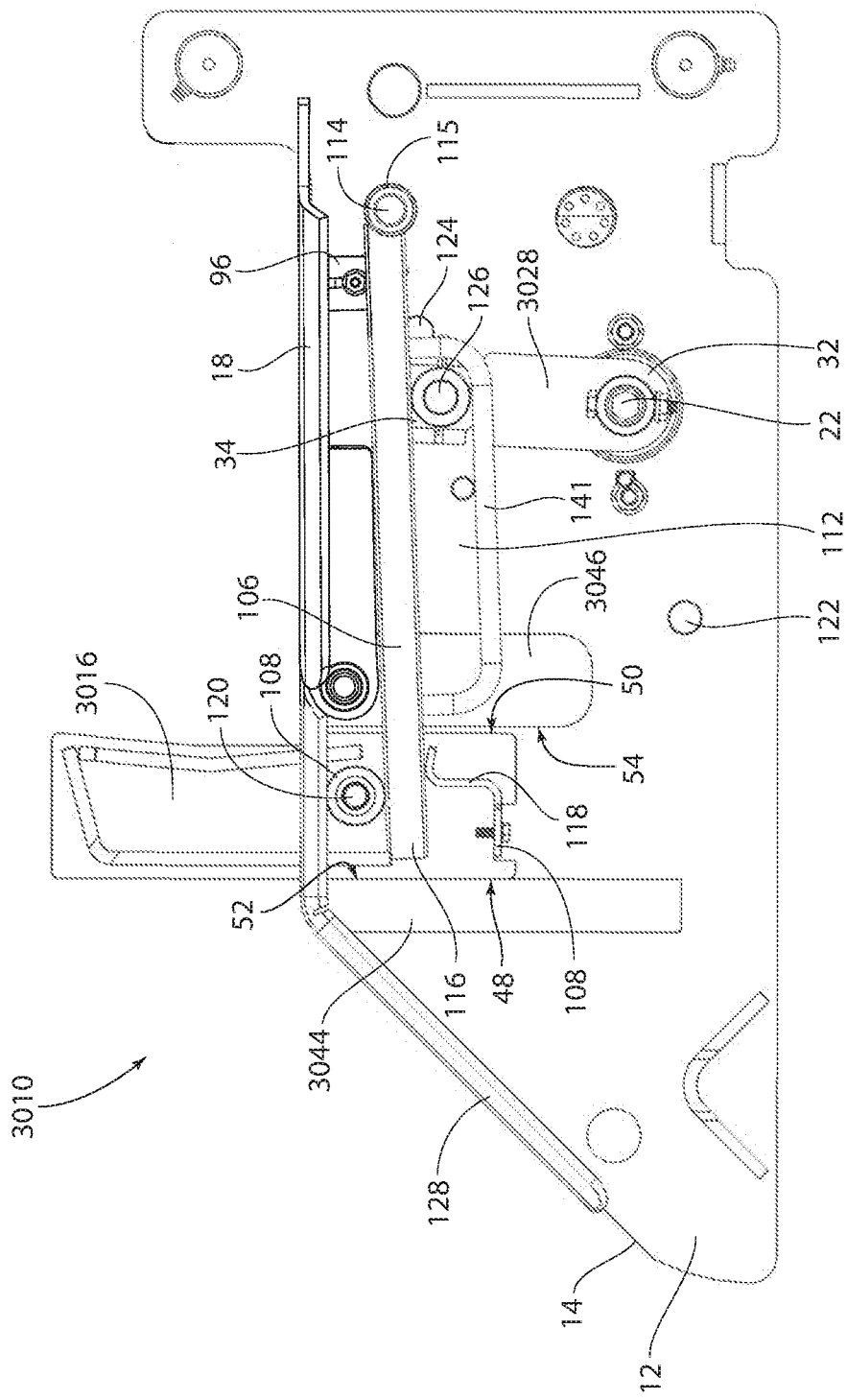
FIG. 14 is a partial right side elevation view of a impactable vehicle restraint with a third embodiment of a motion translation means according to the present invention, with the barrier in the raised position.

FIGS. 13 and 14 show an additional alternative embodiment of a vehicle restraint 3010 having an over-toggle linkage arrangement of an impactable barrier 3016 drive system. The over-toggle linkage preferably includes a drive link 3028 and a lift arm 106. The drive link 3028 preferably has a first end 32 and a second end 34. The first end of the drive link 32 is coupled to the drive shaft 22. The second end of the drive link 34 is slidably engaged with the lift arm 106. In the illustrated embodiment, the lift arm 106 includes a race 112 adapted to receive at least a portion of the drive link 3028. While FIGS. 13 and 14 show the second end 32 of the drive link 3028 being slidably coupled to the lift arm 106, it should be understood that such coupling may be made using any means known in the art.

The lift arm 106 has a first end 114 and a second end 116. The lift arm 110 is preferably pivotable about its first end 114. In this manner, as the drive link 3028 rotates, the lift arm 106 is caused to pivot about the first end 114. The lift arm 106 is adapted to transfer rotational movement of the drive. shaft 22 into linear movement of the barrier 3016. In the illustrated embodiment the barrier 3016 is provided with one or more engaging components 108 adapted to engage the lift arm 106. The lift arm 106 is adapted to cause linear movement of the barrier 3016 by the second end 116 of the lift arm 106 imparting force against engaging components 108 supported by or formed as an integral part of the barrier 3016. The interaction between the lift arm 106 and the engaging components 108 may be a sliding interaction, or less friction may be provided by a rolling engagement, such as with a roller bearing 120. In the illustrated embodiment the second end 116 of the lift arm 106 is in sliding interaction with engaging components 108 taking the form of a barrier retainer 118 and a barrier bearing 120. However, it should be understood that such components may take any form known in the art. For example, either one or both of the sliding components 118,120 may be a member rigidly fixed to the barrier 3016.

The over-toggle linkage arrangement preferably also includes a front guide 3044 and a rear guide 3046. The front guide 3044 and rear guide 3046 are preferably fixedly supported by the impactable vehicle restraint. In the illustrated embodiment, the barrier 3016 has a front surface 48 and a rear surface 50. The front guide 3044 has at least one bearing surface 52 along which at least a portion of the front surface 48 of the barrier 3016 travels. The rear guide 3046 has at least one bearing surface 54 along which at least a portion of the rear surface 50 of the barrier 3016 travels. In this manner, barrier 3016 can only move up and down as it is guided by the front guide 3044 and rear guide 3046.

Although the front guide 3044 and rear guide 3046 are each shown as having a generally flat bearing surface 52,54, it should be understood that these elements may take any form known in the art. For example, and not by way of limitation, one or more of the front guide 3044 and rear guide 3046 may take the form of one or more roller bearings.

Preferably, the carriage body 12 is provided with a lower linkage stop 122 and an upper linkage stop 124. The linkage stops 122,124 may take any form known in the art, but in the illustrated embodiment takes the form of a member coupled to the carriage body 12. Each linkage stop 122,124 is preferably adapted to engage at least a portion of the drive link 3028 to prevent the drive link 3028 from further rotation as shown in FIGS. 13 and 14.

The barrier 3016 is movable between a first retracted position (FIG. 13) and a second raised position (FIG. 14). To raise the barrier 3016, moving the barrier 3016 from its first retracted position to the second raised position, the drive shaft 22 is rotated clockwise which in turn rotates the coupled drive link 3028 clockwise about a drive link pin 40. As the drive link 3028 rotates clockwise, the drive link 3028 engages the lift arm 106 rotating the lift arm 106 about the lift arm pivot 115. In the illustrated embodiment the drive link 3028 engages the lift arm 106 through a crank roller 126, however, it should be understood that the crank roller 126 is for the reduction of friction in the device and is not required for successful operation. It is contemplated that the crank roller 126 could be eliminated or replaced by any other means known in the art to reduce friction between the drive link 3028 and the lift arm 106. It should also be noted that the lift arm 106 is free to rotate about the lift arm pivot 115 so that as the drive link 3028 rotates clockwise, the lift arm 106 is pivoted clockwise about the lift arm pivot 115.

As described above, the barrier 3016 is guided by front barrier guide block 3044 and rear barrier guide block 3046 such that the barrier 3016 can only move up or down. As such, the clockwise rotation of the lift arm 106 causes the barrier 3016 to move upward through the engagement of the lift arm 106 and the barrier 3016. In the illustrated embodiment the lift arm 106 engages the barrier 3016 through a barrier roller 120. However, it should be understood that the barrier roller 120 is for the reduction of friction and not required for barrier 3016 motion.

The drive link 3028 continues to rotate clockwise until the drive link 3028 has traveled past the point of maximum lift of the lift arm 106. At this point as shown in FIG. 14, a portion of the drive link 3028 engages the upper linkage stop 124. This creates an over toggle condition which prevents further clockwise rotation of the drive link 3028. Any downward force on the barrier 3016, including but not limited to gravity, or the up and down motion of a trailer being loaded or unloaded, is transmitted via the lift arm 106 to force the drive link 3028 clockwise into the upper linkage stop 124. In this configuration, the barrier 3016 is locked in the raised configuration as shown in FIG. 14. This over-toggle position of the drive link 3028 locks the barrier 3016 in the raised position without the need of a brake or clutch in the drive system.

When barrier 3016 is to be lowered, the drive shaft 22 is rotated counter clockwise, which in turn rotates drive, link 3028 counter clockwise. To release and lower the barrier 3016, the drive link 3028 is rotated counterclockwise which slightly raises the lift arm 106 to remove itself from the over toggle position and then allows the lift arm 106 to rotate counter clockwise. The counterclockwise rotation of the lift arm 106 allows the barrier 3016 to lower. In the event there is horizontal pressure on the barrier 3016 that prevents it from freely lowering, for example a RIG tight against it, the drive link 3028 pulls the lift arm 106 counterclockwise via the lift return arm 141 and the barrier retainer 118 to overcome any friction forces that prevent the barrier 3016 from returning to the retracted position. The counterclockwise motion of the drive link 3028 is stopped by the lower linkage stop 122.

Figure 15:
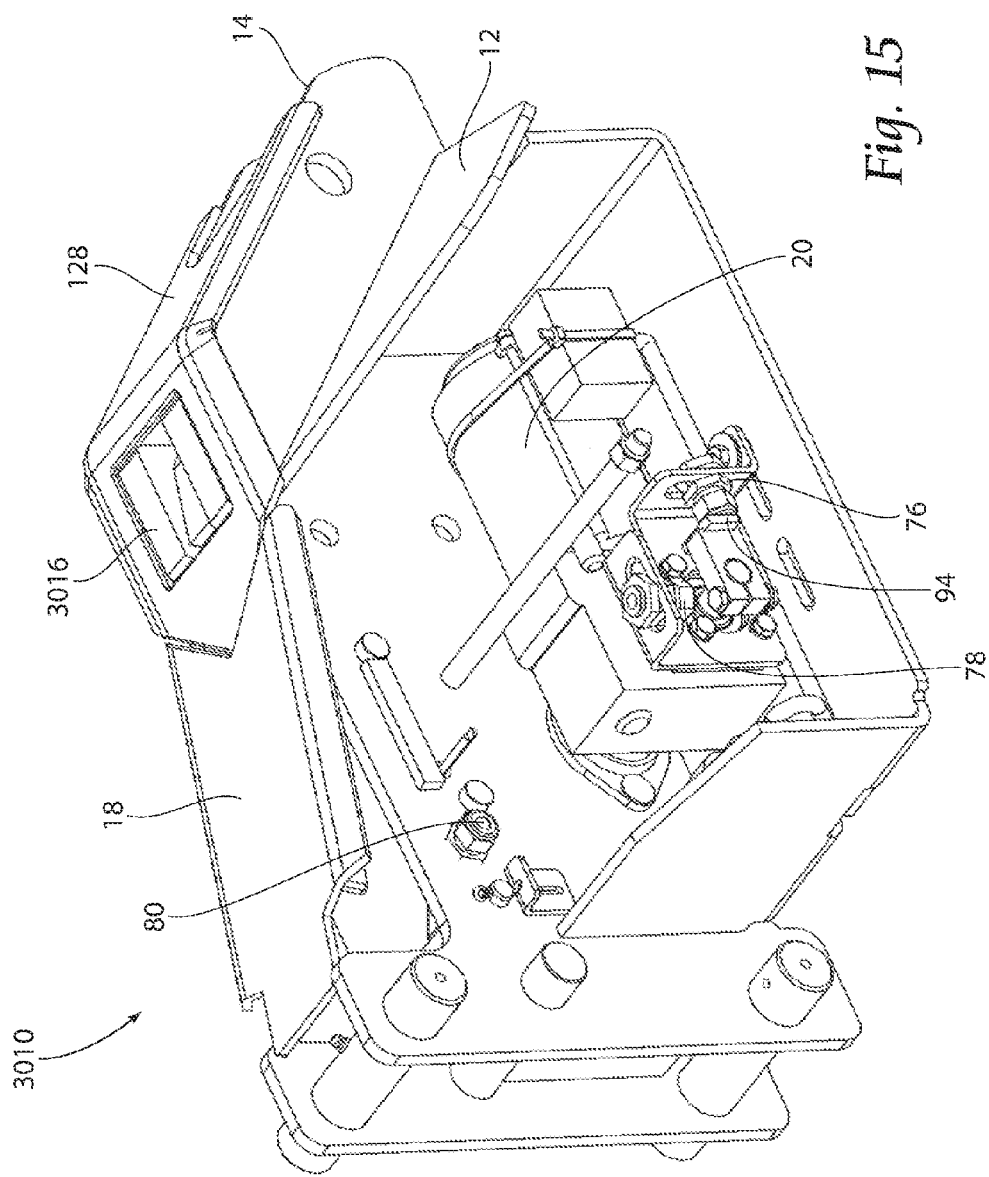
FIG. 15 is a rear perspective view of the impactable vehicle restraint of FIGS. 13 and 14 with the barrier in the retracted position and the motor cover removed.

It is contemplated that such an arrangement may utilize a three sensor arrangement as outlined above. For example, as shown in FIG. 15, an impactable barrier restraint may be provided with a first "barrier retracted" sensor 76 adapted to be engaged when the barrier 3016 is in its retracted position, a second "barrier extended" sensor 78 adapted to be engaged when the barrier 3016 is in its extended position and a third "RIG detected" sensor 80 (which can be seen in FIG. 13) adapted to be engaged when a RIG is in place on the carrier RIG surfaces 14.

Figure 16:
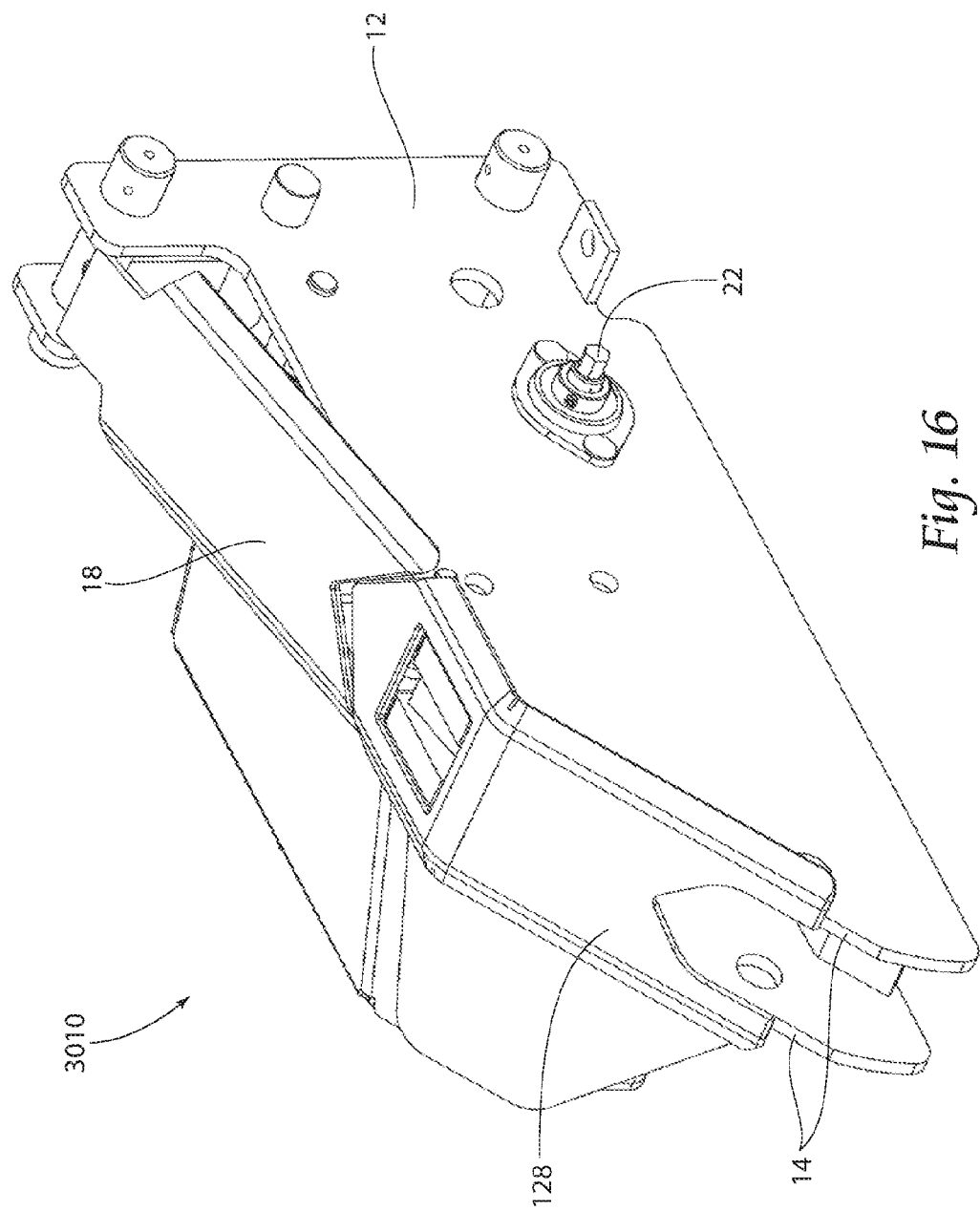
FIG. 16 is a front perspective view of the impactable vehicle restraint of FIGS. 13 and 14 with the barrier in the retracted position.

Impactable vehicle restraints commonly utilize abrasion resistant steels in their construction to minimize wear from the RIG's impact and scraping action while the restraint is being pushed into an operable position. These abrasion resistant steels are generally difficult to source and when found costly to procure in addition to their difficulty in fabrication due to the relative high hardness of the material. It is contemplated that the use of abrasion resistant steel can be eliminated by welding a RIG slider plate 128 to the restraint carriage body 12 as shown in FIGS. 15 and 16. The RIG slider plate 128 increases the surface area along which the RIG contacts the carriage body 12. Increasing the surface area reduces the contact pressure, which in turn reduces the surface hardness required for a durable product. In the illustrated embodiment, the RIG slider plate 128 is made from plain carbon steel, however it should be understood that the RIG slider plate 128 may be made of any number of materials known in the art including various durable plastics.

Likewise, while the illustrated embodiment shows the RIG slider plate 128 as being welded to the carriage body 12, it could also be mechanically attached in other ways, including but not limited to bolts, pins, tab and slot, etc. It is contemplated that utilizing removable fasteners to secure the RIG slider plate 128 to the restraint carriage body 12 would give the advantage of providing an easily replaceable wear part for RIG slider plate 128.

It should be understood that the features described herein may be generally used in any combination, for example, the RIG slider plate may be utilized with any configuration of barrier described herein. Further, it is contemplated that the RIG slider plate may be utilized on any type of impactable vehicle restraint, including, for example, a rotating hook restraint as is well known in the prior art. Likewise, it is contemplated that the three-sensor arrangement may be utilized on any type of vehicle restraint. In the same manner, the control system of FIG. 12 could be utilized with any type of impactable vehicle restraint. Therefore, it should be understood that one or more of the described components may be used when desired without departing from the invention.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:
1. An impactable vehicle restraint comprising:
a carriage body having at least one vertical member;
a rotatable drive shaft disposed at least partially within the carriage body and extending through the at least one vertical member;
a barrier disposed at least partially within the carriage, the barrier being linearly movable between a first position and a second position;
a force translator coupled to and between the rotatable drive shaft and the barrier, the force translator causing the barrier to move between the first and second position as a result of the rotatable drive shaft;
said force translator comprising over toggle means, said over toggle means including a drive member having a first end and a second end a lift member having a first end and a second end, the lift member having a race formed at or near the second end thereof, wherein the drive member first end is coupled to the drive shaft the drive member second end is in sliding engagement with the lift member race, the lift member first end being pivotably coupled to the carriage body, and the lift member second end is in sliding engagement coupled to the barrier; and
wherein the force translator further comprises a first stop linkage coupled to the carrier body and a second stop linkage coupled to the carrier body, wherein the first stop linkage is adapted to limit the rotation of the drive member in a first direction and the second stop linkage adapted to limit rotation of the drive member in a second direction.

2. The impactable vehicle restraint of claim 1 wherein the barrier does not extend beyond the bounds of the carriage body when in the barrier first position.

3. The impactable vehicle restraint of claim 1 wherein the rotatable drive shaft is coupled to a motor with a rotational output.

4. The impactable cluck restraint of claim 1 wherein the force translator further comprises barrier guide means for guiding the linear motion of the barrier.

5. The impactable vehicle restraint of claim 4 wherein the barrier guide means further comprises
a front guide fixed to the carriage body, the front guide having a first bearing surface; and
a rear guide fixed to the carriage body, the rear guide having a second bearing surface.

6. The impactable vehicle restraint of claim 5 wherein the barrier guide means further comprises a lower guide fixed to the carriage body, the lower guide having a third bearing surface.

7. The impactable vehicle restraint of claim 5 wherein
the barrier has a front surface and an opposed rear surface; and
the movement of the barrier between its first and second positions is guided by the engagement of at least a portion of the first bearing surface with at least a portion of the barrier front surface and at least a portion of the second bearing surface with at least a portion of the barrier rear surface.

8. The impactable vehicle restraint of claim 1 wherein the over toggle means further comprises:
said drive member having said first end and said second end;
a pivot member having a first end arid a second end; and
wherein the drive member first end is coupled to the drive shaft, the drive member second, end is rotatable coupled to the pivot member first end, and the pivot member second end is rotatable coupled to the barrier.

9. The impactable vehicle restraint of claim 8 wherein the force translator further comprises a stop linkage coupled to the carrier body, the stop linkage adapted to limit the rotation of the drive member.

10. The impactable vehicle restraint of claim 1 further comprising one or more engaging components coupled to the barrier, the one or more engaging components being adapted to slidable engage the second end of the lift member.

11. The impactable vehicle restraint of claim 1 wherein force translator further comprises
said drive member having said first end and said second end and a race formed at or near the
wherein tile drive member first end is coupled to the drive shaft and the drive member race is in sliding engagement with the barrier.

12. The impactable vehicle restraint of claim 1 further comprising a sliding member coupled to the barrier, wherein the sliding member is in sliding engagement with the drive member race.

* * * * *